US010116357B2

(12) United States Patent
Bi et al.

(10) Patent No.: US 10,116,357 B2
(45) Date of Patent: Oct. 30, 2018

(54) SYSTEM AND METHOD FOR MULTIPLE POINT TRANSMISSION IN A COMMUNICATIONS SYSTEM

(71) Applicant: Futurewei Technologies, Inc., Plano, TX (US)

(72) Inventors: Hao Bi, Lake Zurich, IL (US); Yishen Sun, Buffalo Grove, IL (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 204 days.

(21) Appl. No.: 14/614,066

(22) Filed: Feb. 4, 2015

(65) Prior Publication Data

US 2015/0146623 A1    May 28, 2015

Related U.S. Application Data

(63) Continuation of application No. 13/269,475, filed on Oct. 7, 2011, now Pat. No. 9,838,089.

(51) Int. Cl.
*H04W 4/00* (2018.01)
*H04B 7/024* (2017.01)
(Continued)

(52) U.S. Cl.
CPC .......... *H04B 7/024* (2013.01); *H04L 5/006* (2013.01); *H04L 5/0035* (2013.01);
(Continued)

(58) Field of Classification Search
CPC ...... H04B 7/024; H04W 28/08; H04W 40/22; H04W 72/042; H04W 72/04;
(Continued)

(56) References Cited

U.S. PATENT DOCUMENTS 8,160,611 B1    4/2012 Oroskar
8,738,981 B2    5/2014 Gorokhov et al.
(Continued)

FOREIGN PATENT DOCUMENTS

CN    1620768 A    5/2005
CN    1780296 A    5/2006
(Continued)

OTHER PUBLICATIONS

3rd Generation Partnership Project; Technical Specification Group Radio Access Network; Evolved Universal Terrestrial Radio Access Network (E-TRAN); S1 Application Protocol (S1AP) (Release 8), 3GPP TS 36.413, V8.5.0 (Mar. 2009), 215 pages.
(Continued)

*Primary Examiner* — Harun Chowdhury
(74) *Attorney, Agent, or Firm* — Slater Matsil, LLP

(57) ABSTRACT

A system and method for multiple point transmission in a communications system are provided. A method for multiple point transmission operation comprises modifying a configuration of a radio bearer for use in a multiple point transmission to a user equipment according to operating condition information of the user equipment, reconfiguring the radio bearer according to the modified configuration, and initiating a multiple point transmission to the user equipment using the reconfigured radio bearer.

56 Claims, 18 Drawing Sheets

(51) Int. Cl.
*H04L 5/00* (2006.01)
*H04L 12/24* (2006.01)
*H04W 68/00* (2009.01)
*H04W 72/04* (2009.01)
*H04W 36/18* (2009.01)

(52) U.S. Cl.
CPC ...... *H04L 41/0816* (2013.01); *H04L 41/0826* (2013.01); *H04W 68/00* (2013.01); *H04W 72/04* (2013.01); *H04W 72/042* (2013.01); *H04W 36/18* (2013.01)

(58) Field of Classification Search
CPC .............. H04W 76/025; H04W 36/08; H04W 72/1231; H04L 5/001; H04L 5/0035
USPC ........ 370/252, 328, 329, 311, 331; 455/436, 455/63.1
See application file for complete search history.

(56) References Cited

U.S. PATENT DOCUMENTS

| | | | |
|---|---|---|---|
| 2002/0094814 A1 | 7/2002 | Wigell et al. | |
| 2002/0110097 A1 | 8/2002 | Sugurtharaj et al. | |
| 2003/0063587 A1 | 4/2003 | Cho et al. | |
| 2004/0147236 A1 | 7/2004 | Parkvall et al. | |
| 2005/0169209 A1 | 8/2005 | Miu et al. | |
| 2005/0201353 A1 | 9/2005 | Lee et al. | |
| 2006/0126667 A1 | 6/2006 | Smith et al. | |
| 2008/0056171 A1 | 3/2008 | Khayrallah | |
| 2008/0247354 A1 | 10/2008 | Hsieh et al. | |
| 2009/0168724 A1 | 7/2009 | Umesh et al. | |
| 2009/0185535 A1 | 7/2009 | Lee et al. | |
| 2009/0253433 A1* | 10/2009 | Voyer | H04W 40/22 455/436 |
| 2010/0061243 A1 | 3/2010 | Yi et al. | |
| 2010/0124189 A1 | 5/2010 | Guguen et al. | |
| 2010/0215006 A1 | 8/2010 | Ho et al. | |
| 2010/0302999 A1 | 12/2010 | Hui et al. | |
| 2010/0304682 A1 | 12/2010 | Choi et al. | |
| 2010/0322193 A1 | 12/2010 | Hu et al. | |
| 2010/0322194 A1 | 12/2010 | Hu et al. | |
| 2011/0040888 A1 | 2/2011 | Krishnaswamy et al. | |
| 2011/0134831 A1* | 6/2011 | Pirskanen | H04L 5/001 370/328 |
| 2011/0268007 A1* | 11/2011 | Barany | H04B 7/024 370/312 |
| 2011/0305220 A1 | 12/2011 | Lindoff et al. | |
| 2011/0310845 A1 | 12/2011 | Jung et al. | |
| 2012/0028631 A1 | 2/2012 | Chun et al. | |
| 2012/0064886 A1 | 3/2012 | Kim et al. | |
| 2012/0176884 A1 | 7/2012 | Zhang et al. | |
| 2012/0207092 A1 | 8/2012 | Zirwas et al. | |
| 2012/0257509 A1 | 10/2012 | Natarajan et al. | |
| 2012/0269140 A1* | 10/2012 | Nam | H04B 7/024 370/329 |
| 2012/0272124 A1 | 10/2012 | Huang | |
| 2012/0281564 A1 | 11/2012 | Zhang et al. | |
| 2013/0070862 A1 | 3/2013 | Koh et al. | |
| 2013/0153298 A1 | 6/2013 | Pietraski et al. | |
| 2013/0176988 A1* | 7/2013 | Wang | H04W 28/08 370/331 |

FOREIGN PATENT DOCUMENTS

| | | |
|---|---|---|
| CN | 101030839 A | 9/2007 |
| CN | 101043301 A | 9/2007 |
| CN | 101175017 A | 5/2008 |
| CN | 101217350 A | 7/2008 |
| CN | 101373999 A | 2/2009 |
| CN | 101719809 A | 6/2010 |
| CN | 101877890 A | 11/2010 |
| CN | 101945341 A | 1/2011 |
| CN | 102638331 A | 8/2012 |
| CN | 103201977 A | 7/2013 |
| WO | 2010105145 A1 | 9/2010 |
| WO | 2010123270 A2 | 10/2010 |
| WO | 2011017515 A2 | 2/2011 |
| WO | 2011014840 A1 | 3/2011 |
| WO | 2011056607 A1 | 5/2011 |

OTHER PUBLICATIONS

Koudouridis, et al., "Generic Link Layer Functionality for Multi-Radio Access Networks," Ambient Networks, 2005 (no date), 5 pages.

"3rd Generation Partnership Project; Technical Specification Group Services and System Aspects; General Packet Radio Service (GPRS) enhancements for Evolved Universal Terrestrial Radio Access Network (E-UTRAN) access, (Release 10)," 3GPP TS 23.401, V10.0.0, Jun. 2010, 261 pages.

"3rd Generation Partnership Project; Technical Specification Group Radio Access Network; Evolved Universal Terrestrial Radio Access (E-UTRA) Radio Resource Control (RRC); Protocol Specification (Release 10)," 3GPP TS 36.331, V10.2.0, Jun. 2011, 294 pages.

"Upper Layer (Layer 3) Signaling Standard for cdma2000 Spread Spectrum Systems," 3rd Generation Partnership Project 2, 3GPP2 C.S0005-E, Version 3.0, Jun. 2011, 2,386 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300, V10A.0, Jun. 2011, 194 pages.

Extended European Search Report received in International Application No. 128379994.8 dated Sep. 24, 2014, 9 pages.

Hou, X., et al., "Adaptive Multi-Tx Multi-Rx MIMO Transmission Scheme for LTE-Advanced Downlink," IEEE Global Telecommunications Conference, 2009. GLOBECOM 2009., Nov. 30, 2009-Dec. 4, 2009, 7 pages.

International Search Report and Written Opinion of Patent Cooperation Treaty, International Application No. PCT/CN2012/082556, Applicant Huawei Technologies Co., Ltd., et al., dated Jan. 17, 2013, 13 pages.

International Search Report and Written Opinion of Patent Cooperation Treaty (PCT), International Application No. PCT/CN2012/082545, Applicant Huawei Technologies Co., Ltd., et al., dated Mar. 21, 2013, 15 pages.

Third Office Action received in U.S. Appl. No. 13/269,485, dated Oct. 9, 2014, 12 pages.

"3rd Generation Partnership Project; Technical Specification Group Radio Access Network; Radio Resource control (RRC); Protocol Specification (Release 10)," 3GPP TS 25.331, V10.4.0, Jun. 2011, 1,879 pages.

Youjun, et al., "The Access Network and Protocol Design for CoMP Technique in LTE-Advanced System," IEEE, 2010, 4 pages.

QUALCOMM Inc., "On Inter-site Multi-Point Transmission in HSDPA," 3GPP TSG RAN WG2 Meeting #75-BIS, R2-115196, Zhubhai, China, Oct. 10-14, 2011, 5 pages.

3rd Generation Partnership Project; Technical Specification Group Radio Access Network; Evolved Universal Terrestrial Radio Access (E-UTRA); Packet Data Convergence Protocol (PDCP) specification (Release 10), 3GPP TS 36.323 V10.1.0, Mar. 2011, 26 pages.

3rd Generation Partnership Project; Technical Specification Group Radio Access Network; Evolved Universal Terrestrial Radio Access Network (E-UTRAN); X2 application protocol (X2AP) (Release 10), 3GPP TS 36.423 V10.3.0, Sep. 2011, 132 pages.

* cited by examiner

SYSTEM AND METHOD FOR MULTIPLE POINT TRANSMISSION IN A COMMUNICATIONS SYSTEM This application is a continuation of U.S. patent application Ser. No. 13/269,475, entitled "System and Method for Multiple Point Transmission in a Communications System," filed on Oct. 7, 2011, which application is hereby incorporated herein by reference.

TECHNICAL FIELD

The present invention relates generally to digital communications, and more particularly to a system and method for multiple point transmission in a communications system.

BACKGROUND

In order to achieve better channel utilization and increase overall performance, multiple transmission and multiple reception antennas (also commonly referred to as multiple input, multiple output (MIMO)) at both enhanced Node B (eNB) (or base station (BS), Node B (NB), communications controller, and so forth) and User Equipment (UE) (or mobile station (MS), terminal, user, subscriber, subscriber equipment, and so on) are considered.

An extension to MIMO makes use of multiple transmission points (each of which may be a set of geographically co-located transmit antennas) to transmit to a single UE or a group of UE. The transmissions from the multiple transmission points may occur at different times so that over a given time window, the UE (or the group of UE) will receive transmissions from all of the multiple transmission points. This operating mode may often be referred to as multiple point transmission. As an example, at a first time, a first transmission point may transmit to a UE, at a second time, a second transmission point may transmit to the UE, and so on.

Coordinated multiple point (CoMP) transmission is one form of multiple point transmission, wherein the transmissions made by the multiple transmission points are coordinated so that the UE or the group of UE may be able to either combine the transmissions made by the multiple transmission points or avoid interference to improve overall performance. A transmission point may be an eNB, a part of an eNB (i.e., a cell), a remote radio head (RRH) connected to an eNB, or so on. It is noted that sectors of the same site, e.g., an eNB, correspond to different transmission points. Similarly, CoMP reception involves the reception of a transmitted signal(s) at multiple geographically separated reception points CoMP transmission and reception is being considered for inclusion in next generation wireless communications systems, such as in Third Generation Partnership Project (3GPP) Long Term Evolution (LTE) Advanced standards compliant communications systems, as a tool to improve the coverage of high data rates, cell-edge throughput, and/or to increase overall communications system throughput in both high load and low load scenarios.

SUMMARY OF THE INVENTION

These technical advantages are generally achieved by embodiments of the present invention which provides a system and method for multiple point transmission in a communications system.

In accordance with an example embodiment of the present invention, a method for multiple point transmission operation is provided. The method includes modifying a configuration of a radio bearer for use in a multiple point transmission to a user equipment according to operating condition information of the user equipment, reconfiguring the radio bearer according to the modified configuration, and initiating a multiple point transmission to the user equipment using the reconfigured radio bearer.

In accordance with another example embodiment of the present invention, a controller is provided. The controller includes a processor, and a transmitter coupled to the processor. The processor modifies a configuration of a radio bearer for use in a multiple point transmission to a user equipment according to operating condition information for the user equipment, and reconfigures the radio bearer according to the modified configuration. The transmitter initiates a multiple point transmission to the user equipment using the reconfigured radio bearer In accordance with another example embodiment of the present invention, a communications system is provided. The communications system includes a primary transmission point and a secondary transmission point. The primary transmission point splits downlink data of a radio bearer into a first data of the radio bearer and a second data of the radio bearer, processes the downlink data at a first network layer, processes the first data at a second network layer, and transmits the first data of the radio bearer to a user equipment. The secondary transmission point receives the second data of the radio bearer from the primary transmission point, processes the second data at the second network layer, and transmits the second data of the radio bearer to the user equipment.

In accordance with another example embodiment of the present invention, a method for operating a primary transmission point is provided. The method includes informing a user equipment of a modified configuration of a radio bearer used in a multiple point transmission to the user equipment, and confirming an acknowledgement of the modified configuration by the user equipment with a controller.

In accordance with another example embodiment of the present invention, a method for operating a user equipment is provided. The method includes receiving, from a primary transmission point, a modified configuration of a radio bearer used in a multiple point transmission to the user equipment, and transmitting an acceptance of the modified configuration.

One advantage of an embodiment is that multiple point transmission is supported without stringent timing requirements, which may make implementation difficult and/or expensive.

A further advantage of an embodiment is that techniques for radio bearer establishment and/or modification allow for implementation of multiple points transmission without requiring significant hardware and/or software changes, which may help to simplify implementation and keep costs low.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to multiple point transmissions from multiple transmission points over a single radio bearer. Each transmission point includes an RLC entity, while one transmission point also includes a PDCP entity. At a multi-point controller, decisions to modify an existing multiple point configuration is made based on system conditions, resulting in the addition of an additional transmission point, the removal of an existing transmission point, the addition of a radio bearer, moving an existing transmission point, and so on.

The present invention will be described with respect to example embodiments in a specific context, namely a 3GPP LTE-Advanced compliant communications system. The invention may also be applied, however, to other standards compliant communications systems, such as IEEE 802.16m, WiMAX, and so on, as well as non-standards compliant communications systems that support multiple point transmission.

Figure 1:
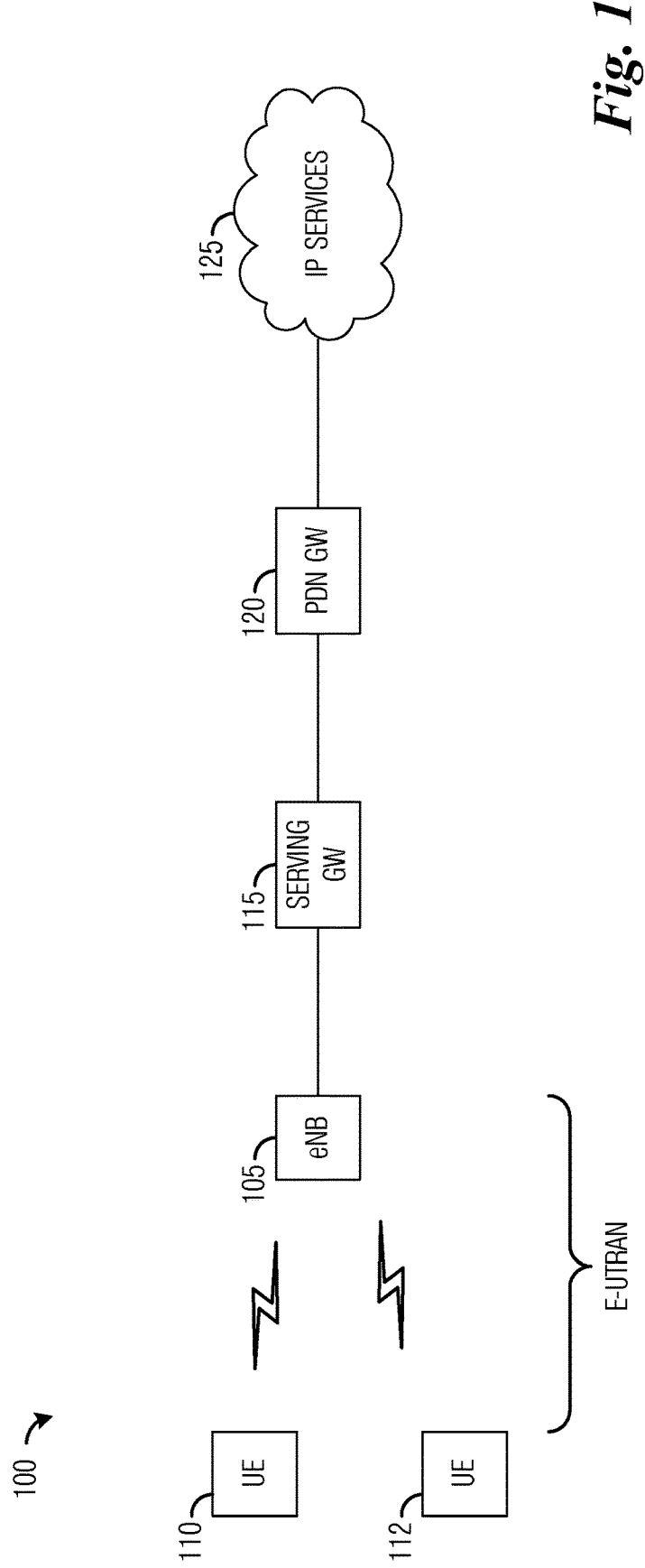
FIG. 1 illustrates an example communications system according to example embodiments described herein.

FIG. 1 illustrates a communications system 100. Communications system 100 includes an eNB 105 serving UE 110 and UE 112. eNB 105 (as well as other eNBs and their associated cells) provides an air interface for communications system 100 and is commonly referred to as an Enhanced Universal Mobile Telecommunications System (UMTS) Terrestrial Radio Access Network (E-UTRAN). A connection may be setup from a UE through eNB 105, a serving gateway (serving GW) 115, and a packet data network gateway (PDN GW) 120 to an operator's Internet Protocol (IP) services network 125.

While it is understood that communications systems may employ multiple eNBs capable of communicating with a number of UEs, only one eNB, two UEs, one serving GW, and one PDN GW are illustrated for simplicity.

Figure 2:
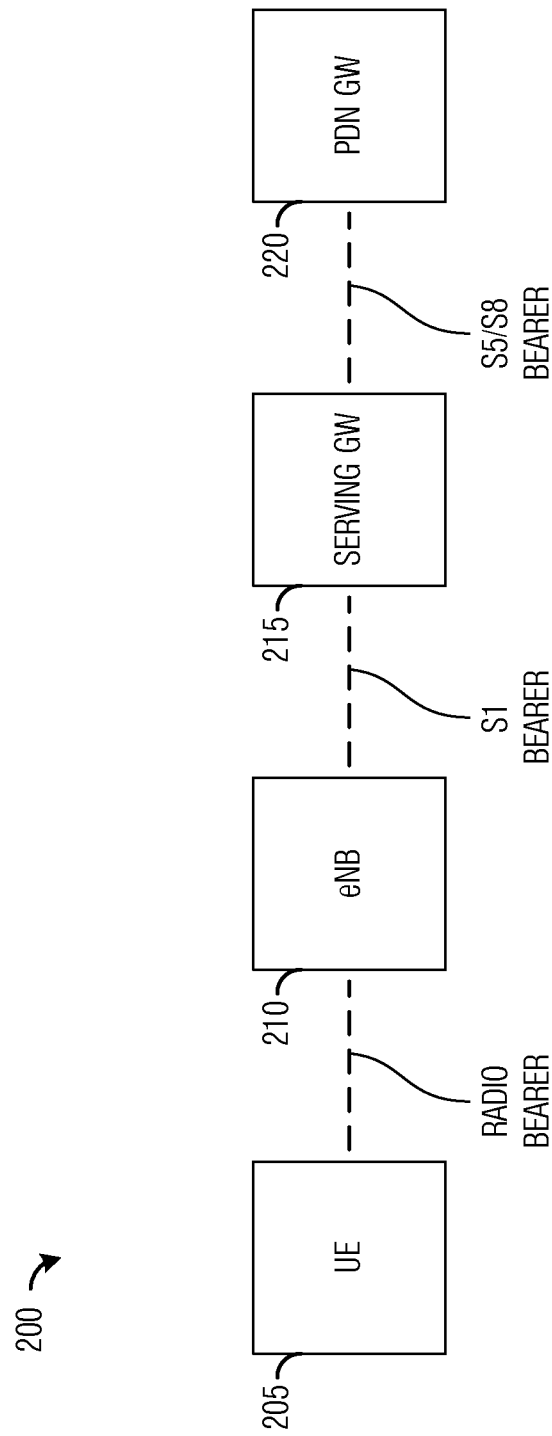
FIG. 2 illustrates an example communications system, wherein a transport of packets is highlighted according to example embodiments described herein.

FIG. 2 illustrates a communications system 200, wherein a transport of packets is highlighted. The transport of packets from PDN GW 220 to UE 205 may be organized through Evolved Packet System (EPS) bearers, which may be radio or wireline bearers. Between PDN GW 220 and serving GW 215, an S5/S8 bearer supports the transport of packets, while between serving GW 215 and eNB 210, an S1 bearer supports the transport of packets. A radio bearer supports the transport of packets between eNB 210 and UE 205. Traffic flows may be aggregated and then sent over respective bearers to their intended destination.

Figure 3:
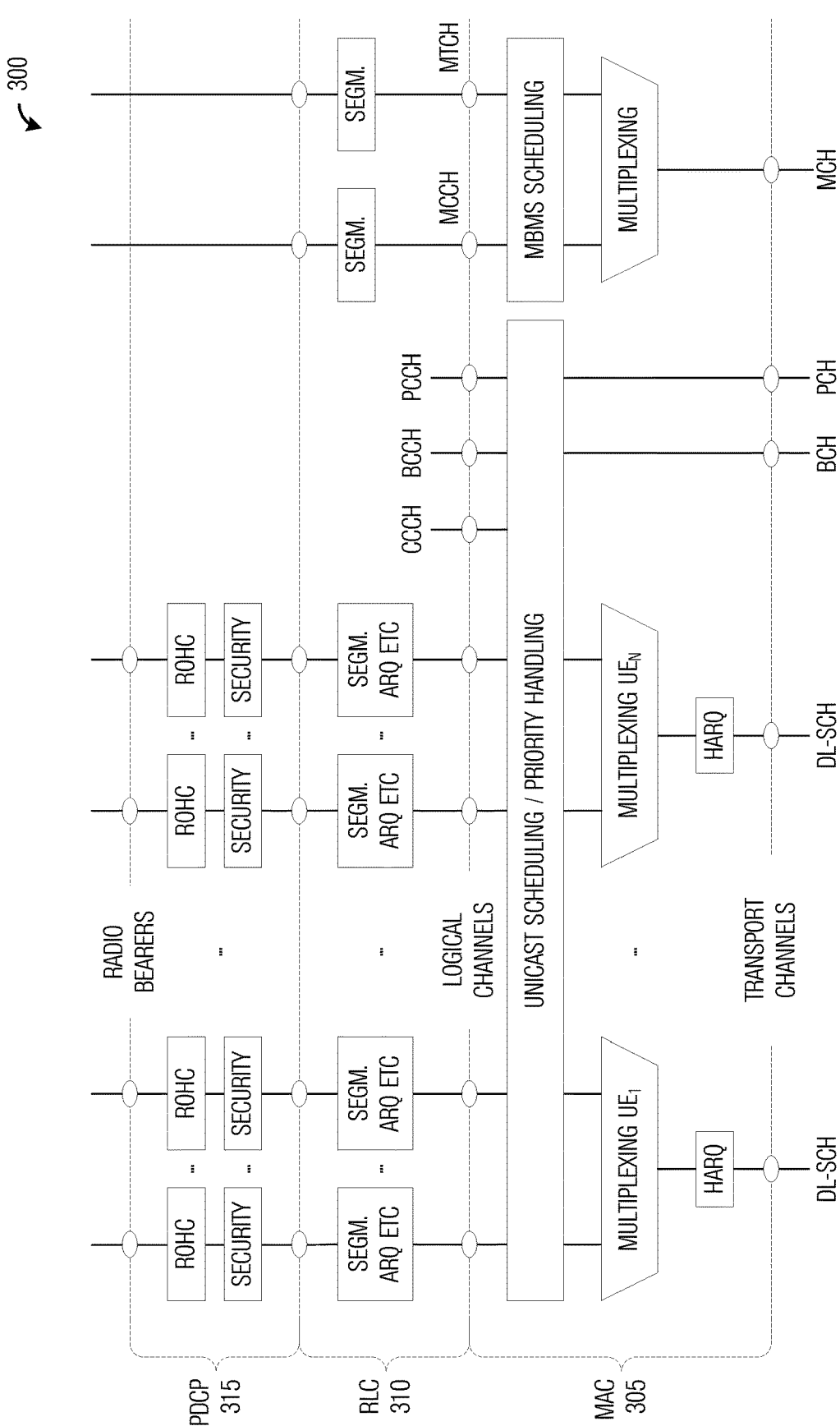
FIG. 3 illustrates an example portion of a protocol stack used in data transmission over a radio bearer according to example embodiments described herein.

FIG. 3 illustrates a portion of a protocol stack 300 used in data transmission over a radio bearer. Protocol stack 300 illustrates a medium access control (MAC) layer 305, a radio link control (RLC) layer 310, and a packet data convergence control (PDCP) layer 315. In current generation 3GPP LTE communications systems (e.g., 3GPP LTE Release-8, Release-9, and Release-10), each radio bearer of a UE is associated with one PDCP entity, and each PDCP entity is associated with one RLC entity for DL transmissions.

Figure 4:
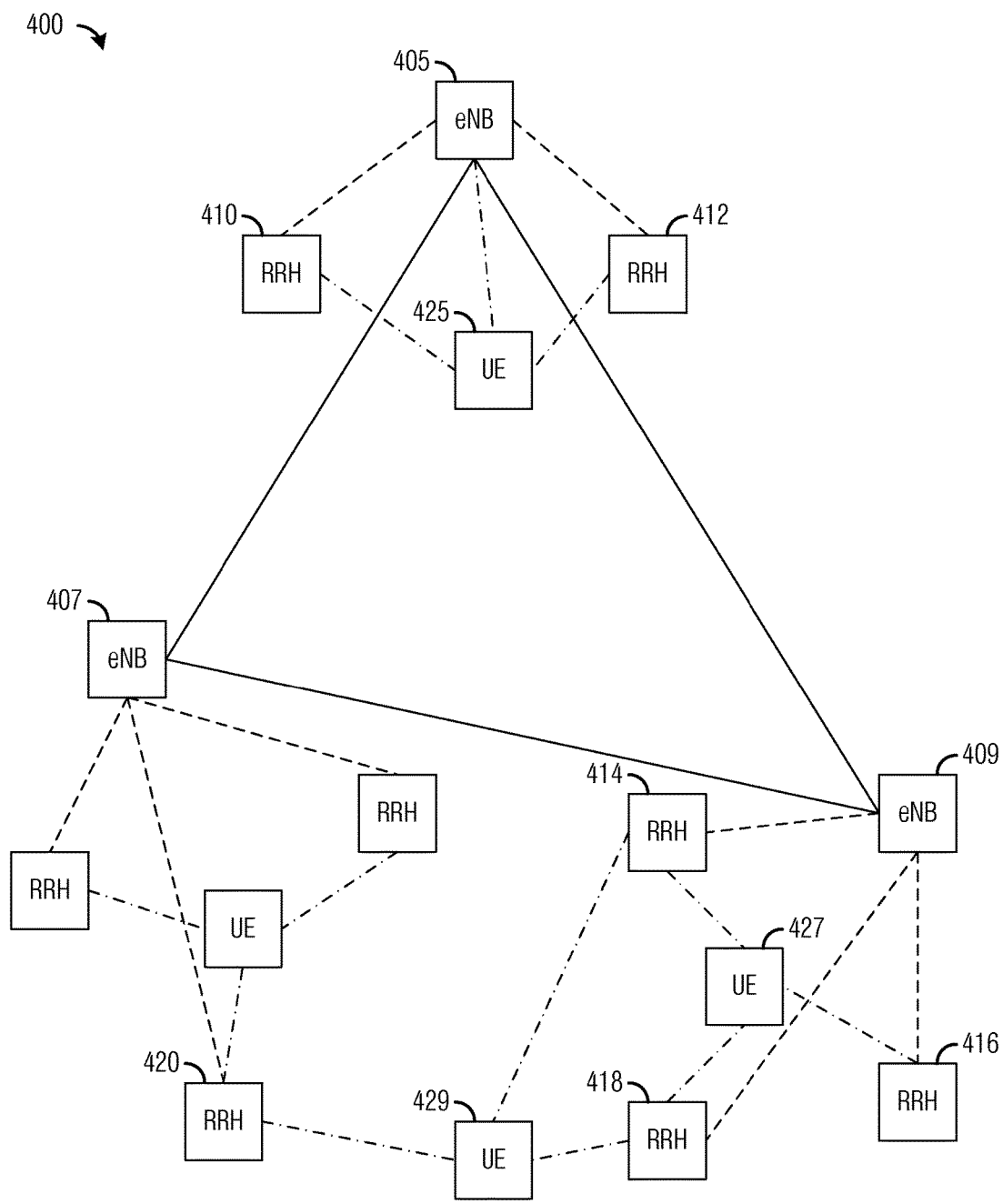
FIG. 4 illustrates an example communications system, wherein DL CoMP transmission is taking place for some of the UEs operating in a coverage area of communications system according to example embodiments described herein.

FIG. 4 illustrates a communications system 400, wherein DL multiple point transmission (e.g., CoMP transmission) is taking place for some of the UEs operating in a coverage area of communications system 400.

Although the discussion of FIG. 4 focuses on eNBs as communications controllers. Other types of communications controllers may be used in place of or in conjunction with eNBs. For example, BSs, Low Power Nodes (LPN), femto cells, pico cells, and so on, may be used as replacements of or in conjunction with eNBs. Therefore, the discussion of eNBs should not be construed as being limiting to either the scope or the spirit of the example embodiments.

Furthermore, the discussion presented herein focuses on CoMP transmission. However, the example embodiments presented here are also operable with a more general form of CoMP transmission, i.e., multiple point transmission. Therefore, the discussion of CoMP transmission should not be construed as being limiting to either the scope or the spirit of the example embodiments.

Communications system 400 includes a number of eNBs, such as eNB 405, eNB 407, and eNB 409, and a number of remote radio heads (RRH), such as RRH 410, RRH 412, RRH 414, RRH 416, RRH 418, and RRH 420. RRHs may also be referred to as remote radio units (RRU). Communications system 400 also includes a number of UEs, such as UE 425, UE 427, and UE 429. The UEs may be served by one or more eNBs, one or more RRHs, or a combination of eNBs and RRHs. The eNBs may allocate a portion of their bandwidth to the RRHs in order to help improve coverage, performance, and so forth.

As shown in FIG. 4, UE 425 may be served by RRH 410 and RRH 412, as well as eNB 405. While UE 427 may be served by RRH 414, RRH 416, and RRH 418. UE 429 may be served by RRHs controlled by different eNBs, such as RRH 414 and RRH 418 (controlled by eNB 409) and RRH 420 (controlled by eNB 407).

A transmission point within a DL serving set may be referred to as a primary transmission point (or simply primary or primary point) and the remaining transmission point(s) in the DL serving set may be referred to as secondary transmission point(s) (or simply secondary, secondary point, secondaries, or secondary points). The primary transmission point may be considered to be a controlling transmission point, responsible for assigning identification information, distributing DL data to the secondary transmission points, and so forth.

Transmission points, such as eNBs, cells of eNBs, RRHs, and so forth, involved in a multiple point operation form a multiple point cooperating set. Furthermore, when the transmission points are involved in CoMP operation, the transmission points form a CoMP cooperating set. The transmission points may be associated with a single cell or different cells. A network pre-connected, UE assisted approach can be taken to configure a CoMP cooperating set for a UE. Based on the condition of channels between a UE and a set of transmission points, which are pre-connected to allow inter-transmission point communications, a CoMP cooperating set may be dynamically setup for an application's data bearer to include transmission points with congenial channel characteristics.

Among members of a CoMP cooperating set, the primary transmission point may be responsible for UE specific signaling, including paging. Other members of the CoMP cooperating set may contribute data transmission.

Figure 5:
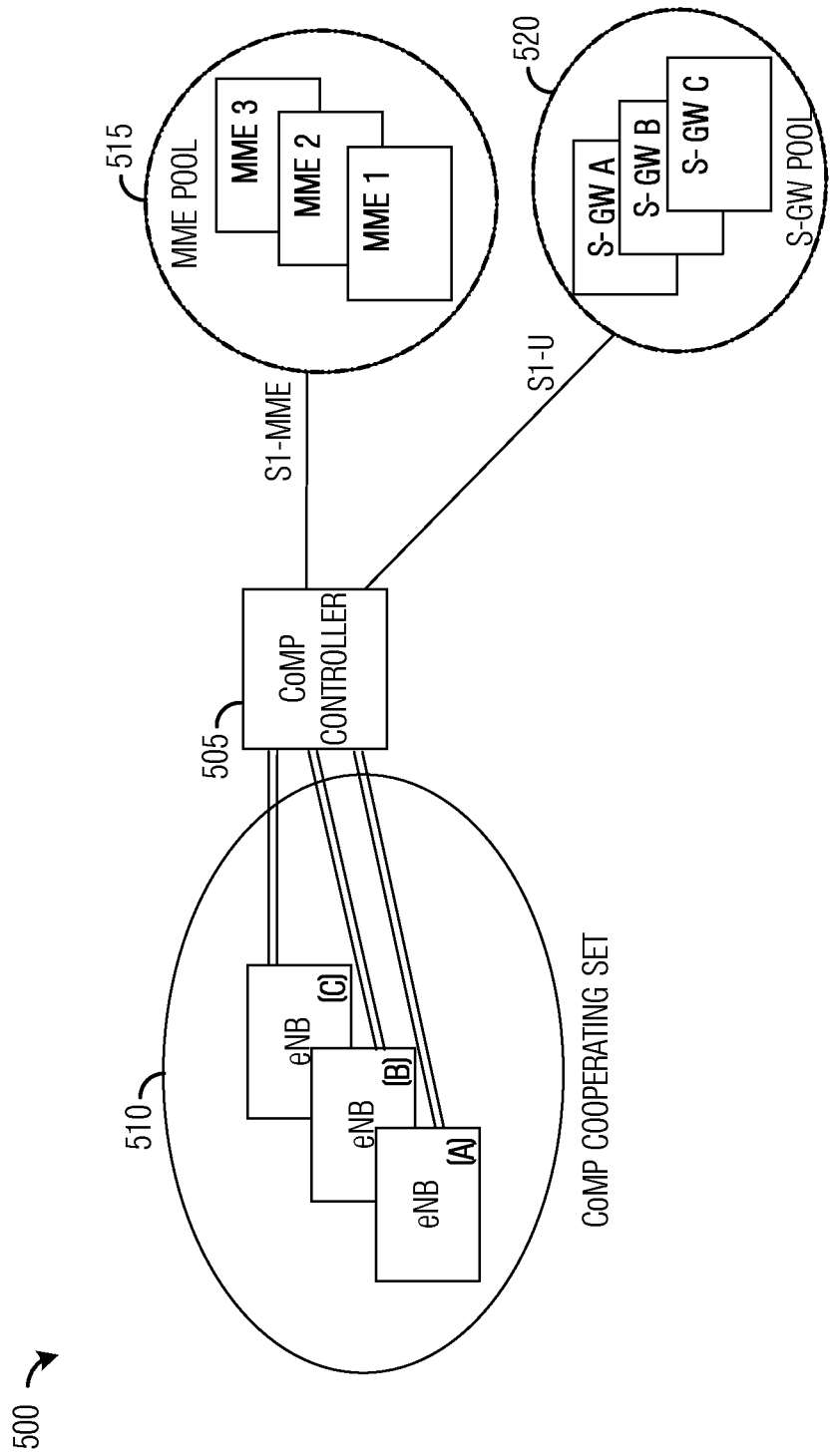
FIG. 5 illustrates an example logical view of a communications system, highlighting a CoMP cooperating set and a CoMP controller according to example embodiments described herein.

FIG. 5 illustrates a logical view of a communications system 500, highlighting a CoMP cooperating set and a CoMP controller. As shown in FIG. 5, a CoMP controller 505 may be viewed as a centralized control point with a CoMP cooperating set 510. CoMP controller 505 may provide a unified control for setting up, configuring CoMP transmissions for radio bearers, coordinating the operation of multiple transmission points with CoMP cooperating set 510, and so on. CoMP controller 505 may be realized as a separate physical entity connecting all (existing as well as potential) transmission points of CoMP cooperating set 510. Alternatively, CoMP controller 505 may be a logical function co-located within an existing network entity, such as an eNB.

Communications system 500 also includes a mobility management entity (MME) pool 515 that may be responsible for providing MMEs that may be used for radio bearer activation and/or deactivation, as well as UE tracking and paging procedures. MME pool 515 may include a number of MMEs that may be assigned to a CoMP controller (such as CoMP controller 505) when the CoMP controller has a need for radio bearer management, and so on. Assigned MMEs may be released once they are no longer needed.

Communications system 500 also includes a serving gateway (S-GW) pool 520 that may be responsible for providing S-GWs that may be used as point of entry and/or exit for traffic to or from a UE. S-GW pool 520 may include a number of S-GWs that may be assigned when needed and released when no longer needed.

According to an example embodiment, a single radio bearer may be associated with multiple RLC entities at multiple transmission points to allow for the transmission of data from the single radio bearer using the multiple transmission points. The use of data splitting between a single PDCP entity and multiple RLC entities allows a CoMP transmission to be setup and configured for individual radio bearers so that the data packets of one radio bearer may be transmitted over multiple transmission points (e.g., eNBs, cells, RRHs, and so on).

Figure 6:
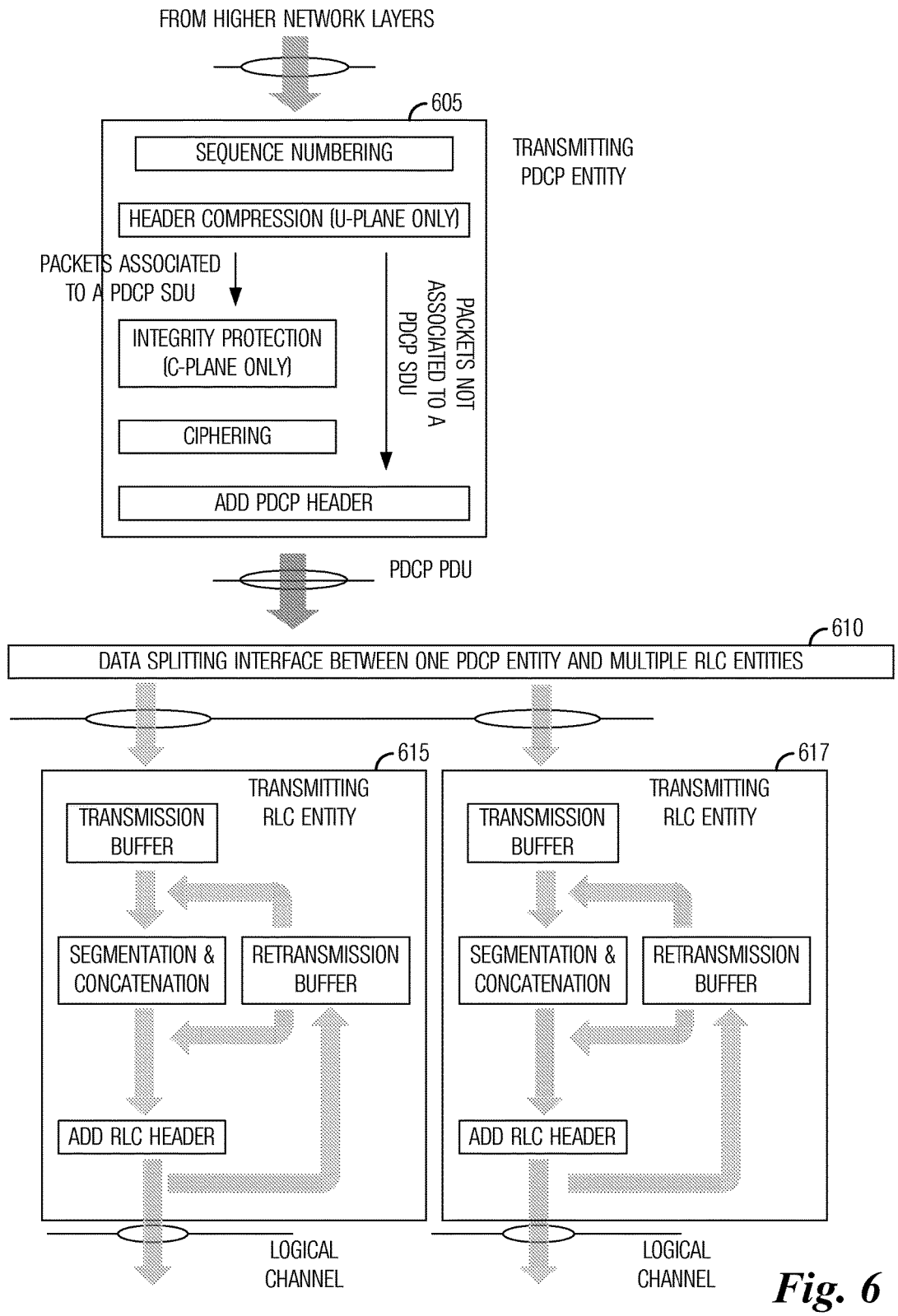
FIG. 6 illustrates an example diagram of a radio bearer split according to example embodiments described herein.

FIG. 6 illustrates a diagram 600 of a radio bearer split. As shown in FIG. 6, data from higher network layers, such as a service data unit (SDU) of a third layer of a multi-layer network protocol stack (for example, the seven-layer Open Systems Interconnection (OSI) protocols), may arrive at a PDCP entity 605. PDCP entity 605 may perform operations such as IP header compression and/or decompression, sequence number maintenance, ciphering, and so forth, to produce a PDCP Protocol Data Unit (PDU).

The PDCP PDUs may be provided to a data splitting interface 610 that may split the PDCP PDUs into two or more PDCP PDU streams. An actual number of PDCP PDU streams may be dependent on a number of separate RLC entities. As an example, if there are three separate RLC entities, then the PDCP PDUs may be split into three PDCP PDU streams.

Although shown as a single entity, data splitting interface 610 may be a distributed entity present in each transmission point in a CoMP cooperating set. As an example, a primary transmission point may include an instantiation of data splitting interface 610 to distribute the PDCP PDUs to the various transmission points, while each of the transmission points (including the primary transmission point) may include an instantiation of data splitting interface 610 to assist in processing the distributed PDCP PDUs.

A distribution of the split of the PDCP PDUs to the PDCP PDU streams may be dependent on factors such as available resources at transmission points corresponding to each RLC entity, a load at the transmission points, capability of the transmission points, channel conditions at the transmission points, and so forth. As an illustrative example, if the two transmission points are relatively equal in terms of available resources, capability, channel condition, and so on, then the PDCP PDUs may be split into two relatively equal PDCP PDU streams, wherein relatively equal implies that over time, approximately ½ of the PDCP PDUs will be allocated to each of the two transmission points. However, if one of the transmission points is significantly more capable or significantly less capable, then the allocation of the PDCP PDUs to that particular transmission point may be adjusted accordingly.

According to an example embodiment, a nature of the split of the PDCP PDUs, such as the distribution, a duration of the split, how to handle lost PDUs, redistribution of the PDUs after one or more PDUs have been lost, and so forth, may be performed by a CoMP controller and provided to a primary transmission point or by the primary transmission point or by a combination of the CoMP controller and the primary transmission point.

According to an example embodiment, measurements of the performance of the transmission points may be performed to allow for the dynamic adjustment of the allocation of the PDCP PDUs to each of the transmission points. As an example, if transmissions from one transmission point are prone to failure (e.g., being marked as lost), then a number of PDCP PDUs being allocated to the transmission point may be reduced, while PDCP PDUs being allocated to the other transmission point may be increased.

Although the discussion focuses on two transmission points, a CoMP cooperating set may include any number of transmission points greater than two, such as three, four, five, and so on. Therefore, the discussion of two transmission points should not be construed as being limiting to either the spirit or the scope of the example embodiments.

The PDCP PDU streams may be provided to separate RLC entities, such as RLC entity 615 and RLC entity 617. The separate RLC entities may reside on geographically separated transmission points. As an example, RLC entity 615 may reside on a cell, while RLC entity 617 may reside on another cell, which may or may not be part of the same eNB. A transmission point where PDCP entity 605 resides may provide the PDCP PDU streams to the separate transmission points.

A data splitting interface, such as data splitting interface 610, may be implemented as a separate interface between a PDCP entity (such as PDCP entity 605) and a RLC entity (such as RLC entity 615 and/or RLC entity 617). Alternatively, the data splitting interface may be implemented within a PDCP entity or a RLC entity. Alternatively, a portion of the data splitting interface may be implemented within a PDCP entity and a portion of the data splitting interface may be implemented within a RLC entity.

According to an example embodiment, one transmission point may include both a PDCP entity (such as PDCP entity 605) and an RLC entity (such as RLC entity 615 or RLC entity 617). Generally, such a transmission point may serve as a primary transmission point of a CoMP cooperating set.

The transmission points where the RLC entities reside may then provide the PDCP PDUs in the PDCP PDU streams to the UE.

According to an example embodiment, in order for a UE to know how a single radio bearer is provisioned with multiple RLC entities, a Radio Resource Control (RRC) message may be sent to the UE. The RRC message may include pairings of transmission point identity and RLC configuration information for each transmission point involved with the single radio bearer. As an example, if the single radio bearer is provisioned into three RLC entities, the RRC message may contain three pairings of transmission point identity and RLC configuration information, one per RLC entity.

Figure 7A:
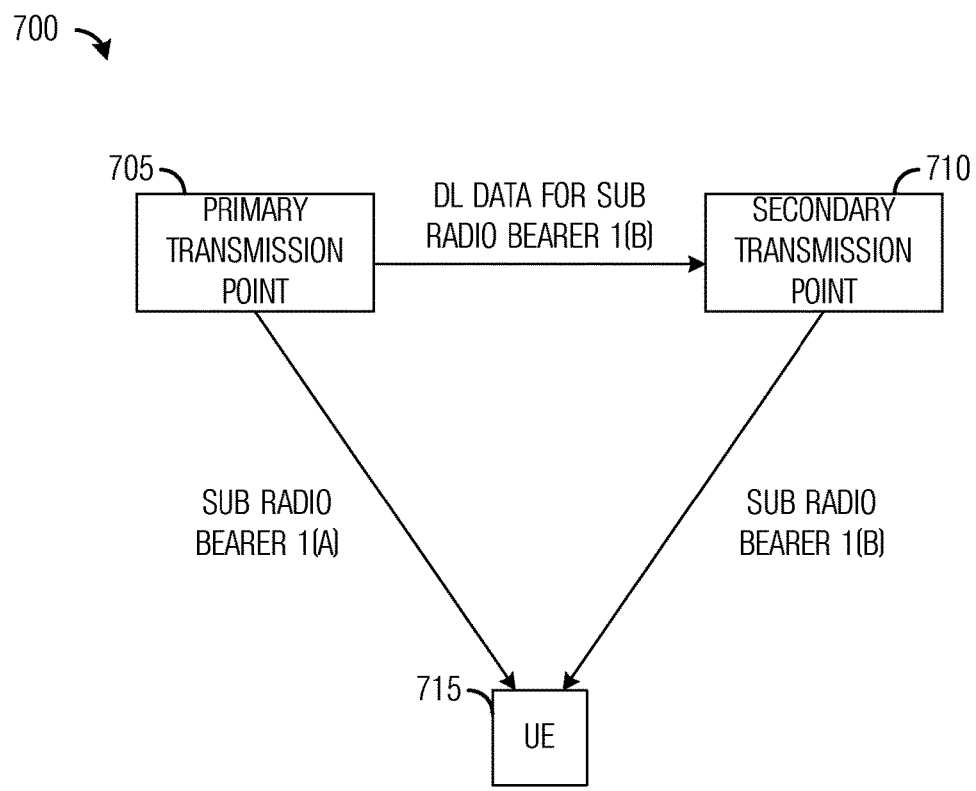
FIG. 7a illustrates an example communications system, wherein a CoMP cooperating set is highlighted according to example embodiments described herein.

FIG. 7a illustrates a communications system 700, wherein a CoMP cooperating set is highlighted. Communications system 700 includes a primary transmission point 705, which may be an eNB, a cell, a RRH, or so on, and a secondary transmission point 710, which may be an eNB, a cell, a RRH, or so on. Both primary transmission point 705 and secondary transmission point 710 may be transmitting to a UE 715.

As discussed previously, in order to support the splitting of a single radio bearer, both primary transmission point 705 and secondary transmission point 710 may each include an RLC entity. Primary transmission point 705 may also include a PDCP entity, while secondary transmission point 710 may not (at least with respect to the single radio bearer used in the CoMP cooperating set involving UE 715).

As shown in FIG. 7a, a single radio bearer is shared between the two transmission points, with a branch of radio bearer between primary transmission point 705 and UE 715 being labeled as sub radio bearer 1(A) and a branch of radio bearer between secondary transmission point 710 and UE 715 being labeled as sub radio bearer 1(B). In order for secondary transmission point 710 to transmit information to UE 715, primary transmission point 705 may provide data, information, and so on, to secondary transmission point 710 over a backhaul link, for example.

Figure 7B:
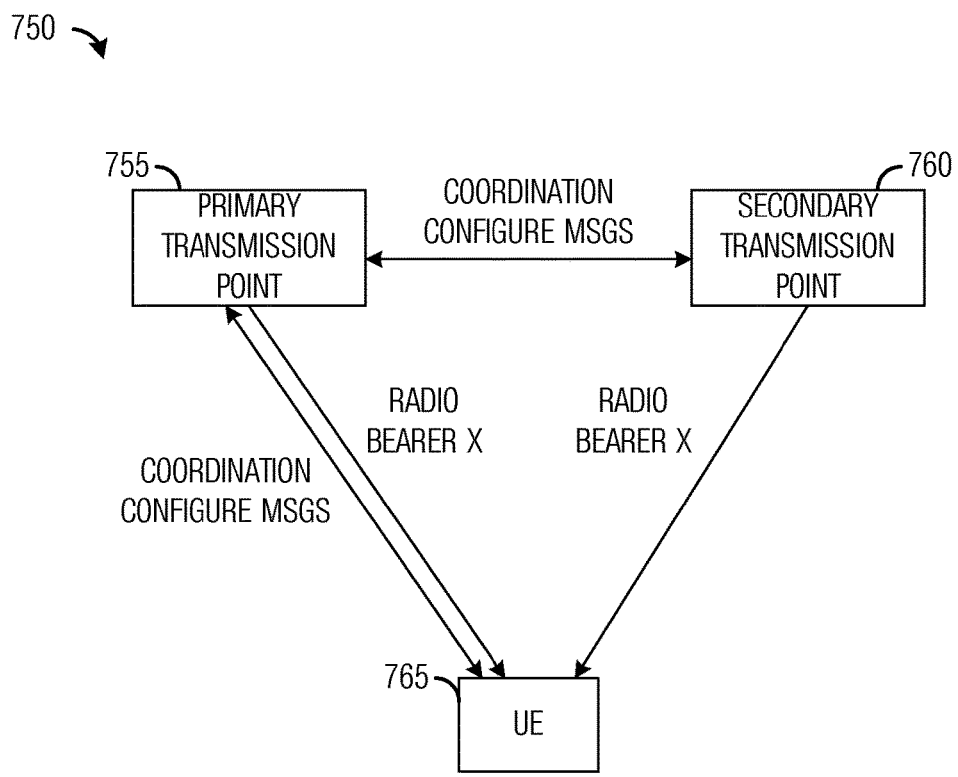
FIG. 7b illustrates an example communications system, wherein a setting up or configuration of a radio bearer is highlighted according to example embodiments described herein.

FIG. 7b illustrates a communications system 750, wherein a setting up or configuration of a radio bearer is highlighted. Communications system 750 includes a primary transmission point 755 and a secondary transmission point 760. Both primary transmission point 755 and secondary transmission point 760 may be transmitting to UE 765.

As shown in FIG. 7b, primary transmission point 755 and UE 765 may exchange messages to inform UE 765 of changes to its CoMP cooperating set, and primary transmission point 755 and secondary transmission point 760 may exchange messages through a CoMP controller, for example, to setup or configure the splitting of a radio bearer (shown as radio bearer X in FIG. 7b). Once the splitting of radio bearer X has been setup or configured, both primary transmission point 755 and secondary transmission point 760 may transmit to UE 765 over radio bearer X.

Figure 7C:
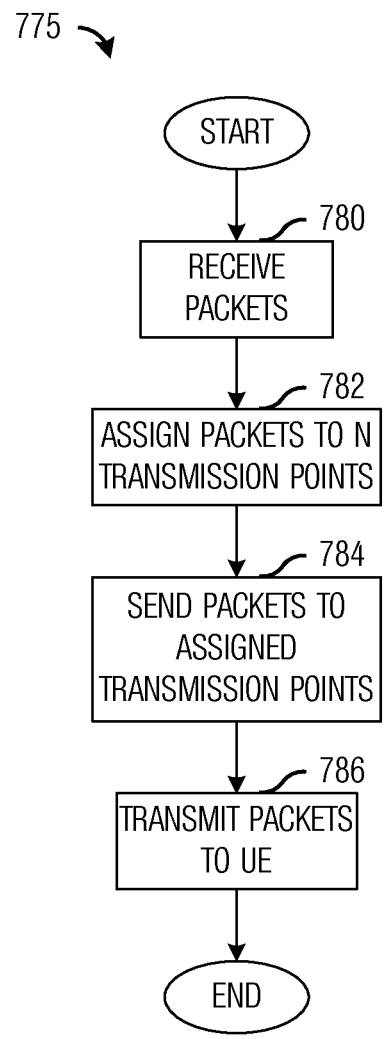
FIG. 7c illustrates an example flow diagram of primary transmission point operations in transmitting packets to a UE over a single radio bearer according to example embodiments described herein.

FIG. 7c illustrates a flow diagram of primary transmission point operations 775 in transmitting packets to a UE over a single radio bearer. Primary transmission point operations 775 may be indicative of operations occurring in a primary transmission point as it provides packets to other transmission points in a CoMP cooperating set for transmission to a UE.

Primary transmission point operations 775 may begin with the primary transmission point receiving packets to be transmitted to the UE (block 780). According to an example embodiment, the primary transmission point may receive the packets from a serving gateway that couples the primary transmission point to a source of the packets.

The primary transmission point may assign (block 782) and then send each of the packets that it receives from the serving gateway to one of N transmission points in the CoMP cooperating set (block 784). It is noted that the primary transmission point may be considered to be one of the N transmission points. According to an example embodiment, the primary transmission point may assign (e.g., distribute) the packets to the N transmission points based on a desired distribution. As an example, if each transmission point is to receive the same number of packets, then the primary transmission point may send 1/N-th of the total number of packets to each transmission point. Alternatively, the primary transmission point may send more packets to transmission points that are more capable, have better quality channels to the UE, have lower load, and so forth. Similarly, transmission points that are less capable, have lower quality channels to the UE, have greater load, and so on, may be sent fewer packets.

According to an example embodiment, the primary transmission point may determine the desired distribution for distributing the packets to the N transmission points. Additionally, the primary transmission point may determine other aspects of the CoMP transmission, such as a duration of the split, how to handle lost PDUs, redistribution of the PDUs after one or more PDUs have been lost, and so forth. Alternatively, a CoMP controller may determine the desired distribution, as well as the other aspects of the CoMP transmission, and provide the information to the primary transmission point. Alternatively, both the primary transmission point and the CoMP controller may cooperate and determine the desired distribution, as well as the other aspects of the CoMP transmission.

The primary transmission point (and the other transmission points in the CoMP cooperation set) may transmit the packets to the UE (block 786). The transmission points in the CoMP cooperation set may or may not need to send the packets in synchrony.

Figure 8:
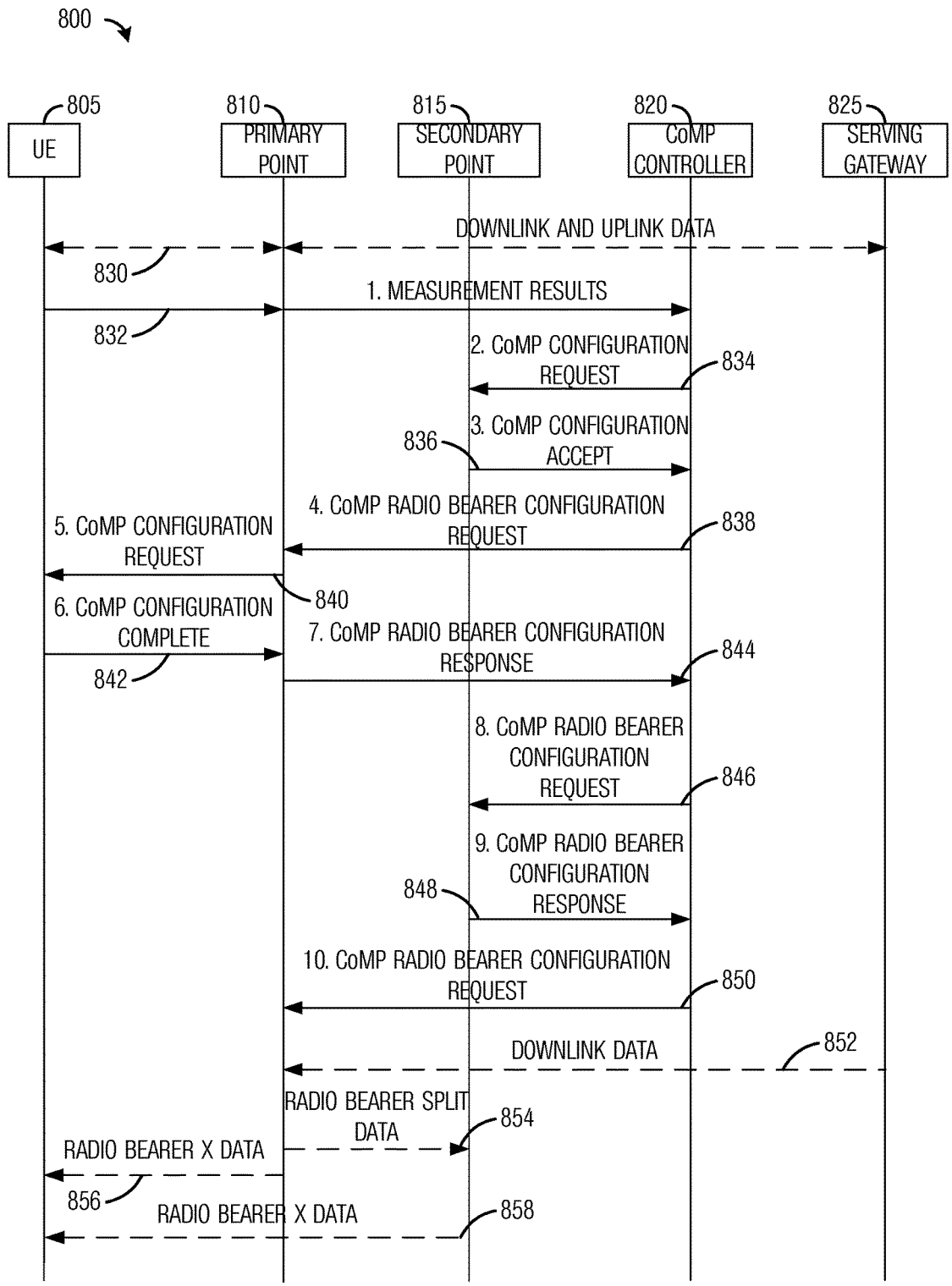
FIG. 8 illustrates an example message flow diagram for setting up or modifying a radio bearer for CoMP transmission according to example embodiments described herein.

FIG. 8 illustrates a message flow diagram 800 for setting up or modifying CoMP transmission configuration. Message flow diagram 800 includes messages exchanged between a UE 805, a primary transmission point 810, a secondary transmission point 815, a CoMP controller 820, and an S-GW 825. Message flow diagram 800 illustrates messages exchanged in a setting up or modifying a CoMP transmission configuration, such as a radio bearer transmission configuration therein, where the setting up or modifying the CoMP transmission configuration may include:

1) Adding a secondary transmission point to the CoMP transmission configuration, and configuring its RLC entity and related data splitting interface with desired Quality of Service (QoS) and data delivery characteristics;

2) Removing a secondary transmission point from the CoMP transmission configuration;

3) Adding a radio bearer to a CoMP transmission configuration; and

4) Switching a component RLC entity from a first secondary transmission point to a second secondary transmission point in a CoMP transmission configuration, which may be accomplished by adding the second secondary transmission point and then removing the first secondary transmission point, for example.

For discussion purposes, consider a situation wherein UE 805 is already participating in communications through primary transmission point 810 and serving gateway 825 (shown as event 830). UE 805 may or may not be participating in multiple point transmission, such as CoMP transmission, with primary transmission point 810 (and at least one secondary transmission point not shown in FIG. 8).

Then, at a specified time, upon receipt of an instruction from primary transmission point 810, an elapsing of a timer, or so on, UE 805 may make a measurement of channel conditions and report the measurement of the channel conditions to primary transmission point 810, which may then provide the measurement of channel conditions to CoMP controller 820 (shown as event 832). The measurement of channel conditions may include measurements of signal levels, interference levels, signal to interference plus noise ratios, signal to noise ratios, and so forth. In addition to measuring its own channel conditions, UE 805 may also measure channel conditions of nearby eNBs, cells, relay nodes (RNs), RRHs, and so on, and report the measurements to primary transmission point 810. In general, UE 805 may be providing a picture of its operating condition through the measurement of the channel conditions.

According to an example embodiment, the setting up or modifying of a CoMP transmission configuration, which may include setting up or modifying a radio bearer, may be based on measurement of channel conditions, as well as other operating conditions, which may include communications system traffic patterns and/or load, traffic amount and/or priority, UE priority, UE service history, and so on.

Based on the measurement of channel conditions made by UE 805 (and potentially as well as measurements from other UEs), CoMP controller 820 may determine an appropriate CoMP transmission configuration (e.g., a CoMP transmission mode) to be used, such as, settings of a radio bearer to be used in CoMP transmission, and so on. Settings of the radio bearer may include which transmission points (e.g., primary transmission point and one or more secondary transmission points) may be involved in carrying the radio bearer, as well as QoS and/or Radio Resource Management (RRM) parameters of the radio bearer for the involved transmission points.

If the measurement of the channel conditions warrant a change in the CoMP transmission configuration, such as adding a transmission point to the CoMP transmission configuration, removing a transmission point from the CoMP transmission configuration, adding a new radio bearer, moving a transmission point, or so on, CoMP controller 820 may send a CoMP Configuration Request message to a transmission point involved (e.g., secondary transmission point 815) to determine if the transmission point involved is amenable to the change in the CoMP transmission configuration (shown as event 834). As an illustrative example, the transmission point involved (secondary transmission point 815) may already be a member of the CoMP cooperating set of UE 805, and CoMP controller 820 may determine that the measurement of the channel conditions warrant that the transmission point involved be removed. Alternatively, the transmission point involved may not be a member of the CoMP cooperating set of UE 805, and CoMP controller 820 may determine that the measurement of the channel conditions warrant that the transmission point involved be added to the CoMP cooperating set.

According to an example embodiment, the CoMP Configuration Request message may include the QoS and/or RRM parameters as determined by CoMP controller 820. The QoS and/or RRM parameters may include QoS Class Index (QCI), Allocation and Retention Priority (ARP), bit rate information (what is a guaranteed bit rate and what is a best effort bit rate, as examples), possible radio resource partitioning (in time and/or frequency domain, for example), and so on.

For discussion purposes, assume that the QoS and/or RRM parameters provided by CoMP controller 820 are acceptable to the transmission point involved. If the QoS and/or RRM parameters as provided by CoMP controller 820 in the CoMP Configuration Request message are acceptable to the transmission point involved (secondary transmission point 815), then the transmission point involved may respond to the CoMP Configuration Request message with a CoMP Configuration Accept message (shown as event 836). The CoMP Configuration Accept message may include an identifier assigned to UE 805 in a context of the transmission point involved.

If the QoS and/or RRM parameters provided by CoMP controller 820 are not acceptable to the transmission point involved, then the transmission point involved may respond negatively to the CoMP Configuration Request message. The CoMP controller 820 may need to adjust the QoS and/or RRM parameters or abort its changes to the CoMP transmission configuration.

Although message flow diagram 800 illustrates CoMP transmission involving a single secondary transmission point, the example embodiments presented herein may be extended to support multiple secondary transmission points by those of ordinary skill in the art of the example embodiments. Therefore, the discussion of a single secondary transmission point should not be construed as being limiting to either the scope or the spirit of the example embodiments.

CoMP controller 820 may then send a CoMP Radio Bearer Configuration Request message to primary transmission point 810 to inform primary transmission point 810 that the CoMP transmission configuration for a specified radio bearer is being changed (shown as event 838). The CoMP Radio Bearer Configuration Request message may include identifying information for the specified radio bearer, identifying information for an associated Enhanced Packet System (EPS) bearer, identifying information for a transmission point that will carry the specified radio bearer (e.g., whether the specified radio bearer is to be added to primary transmission point 810 or secondary transmission point 815), identifying information for UE 805 in the transmission that will be carrying the specified radio bearer, configuration information on how the specified radio bearer will be transmitted in the transmission point involved (secondary transmission point 815) (i.e., whether or not data for the specified radio bearer is to be split between primary transmission point 810 and secondary transmission point 815, and if the data is to be split, what new QoS control parameters, such as QCI, ARP, bit rate, and so forth, are to be used in primary transmission point 810), how in-order delivery of PDCP packets should be performed to combine data from RLC entities corresponding to different transmission points, how data retransmissions should be handled should a PDCP packet transmission fail, and so forth.

Primary transmission point 810 may inform UE 805 of changes to the CoMP transmission configuration with a CoMP Configuration Request message (shown as event 840). The CoMP Configuration Request message may identify the transmission points involved in the CoMP transmission. The CoMP Configuration Request message may also identify associated radio bearer and EPS bearer, the identity of UE 805 with the transmission points, associated radio bearer configuration parameters, and so on. The configuration parameters for the associated radio bearer may include how in-order delivery of PDCP packets should be performed to combine data from the RLC entities from the different transmission points, how UE 805 should respond to missing PDCP packets, and so forth.

UE 805, from the CoMP Configuration Request message from primary transmission point 810, knows that it may be sent data packets from the associated radio and EPS bearers using specified PDCP and RLC parameters. UE 805 may also make use of information regarding in-order delivery of PDCP packets to combine data from the RLC entities of different transmission points of the radio bearer. UE 805 may also provide status reports about PDCP packets if it is required to do so. UE 805 may respond positively to the CoMP Configuration Request message with a CoMP Configuration Complete message indicating that it is ready to receive the transmissions (shown as event 842).

After receiving the positive response from UE 805 (i.e., the CoMP Configuration Complete message), primary transmission point 810 may respond positively to CoMP controller 820 with a CoMP Radio Bearer Configuration Response message (shown as event 844).

CoMP controller 820 may send to secondary transmission point 815 a CoMP Radio Bearer Configuration Request message to make changes to the CoMP transmission configuration (shown as event 846). The CoMP Radio Bearer Configuration Request message may include QoS and/or RRM parameters for the radio bearer. The QoS and/or RRM parameters may include configuration information for RLC entity and MAC entity located at secondary transmission point 815. Secondary transmission point 815 may also be provided information regarding if it should provide reports of packets with failed delivery attempts and how to do so.

Secondary transmission point 815 may respond positively to the CoMP Radio Bearer Configuration Request message with a CoMP Radio Bearer Configuration Response message (shown as event 848). The CoMP Radio Bearer Configuration Response message may be sent by secondary transmission point 815 after it has stored the received parameters (e.g., the QoS and/or RRM parameters) and/or configured associated RLC and MAC entities.

CoMP controller 820 may inform primary transmission point 810 that changes to the CoMP transmission configuration has been established for UE 805 in a CoMP Radio Bearer Configuration Request message (shown as event 850). Primary transmission point 810 may receive packets for the radio bearer from serving gateway 825 (shown as event 852) and pass some of the packets, based on a distribution, for example, to secondary transmission point 815 through a data splitting interface (shown as event 854). Packets of the radio bearer may be transmitted to UE 805 from both primary transmission point 810 (shown as event 856) and secondary transmission point 815 (shown as event 858).

Figure 9:
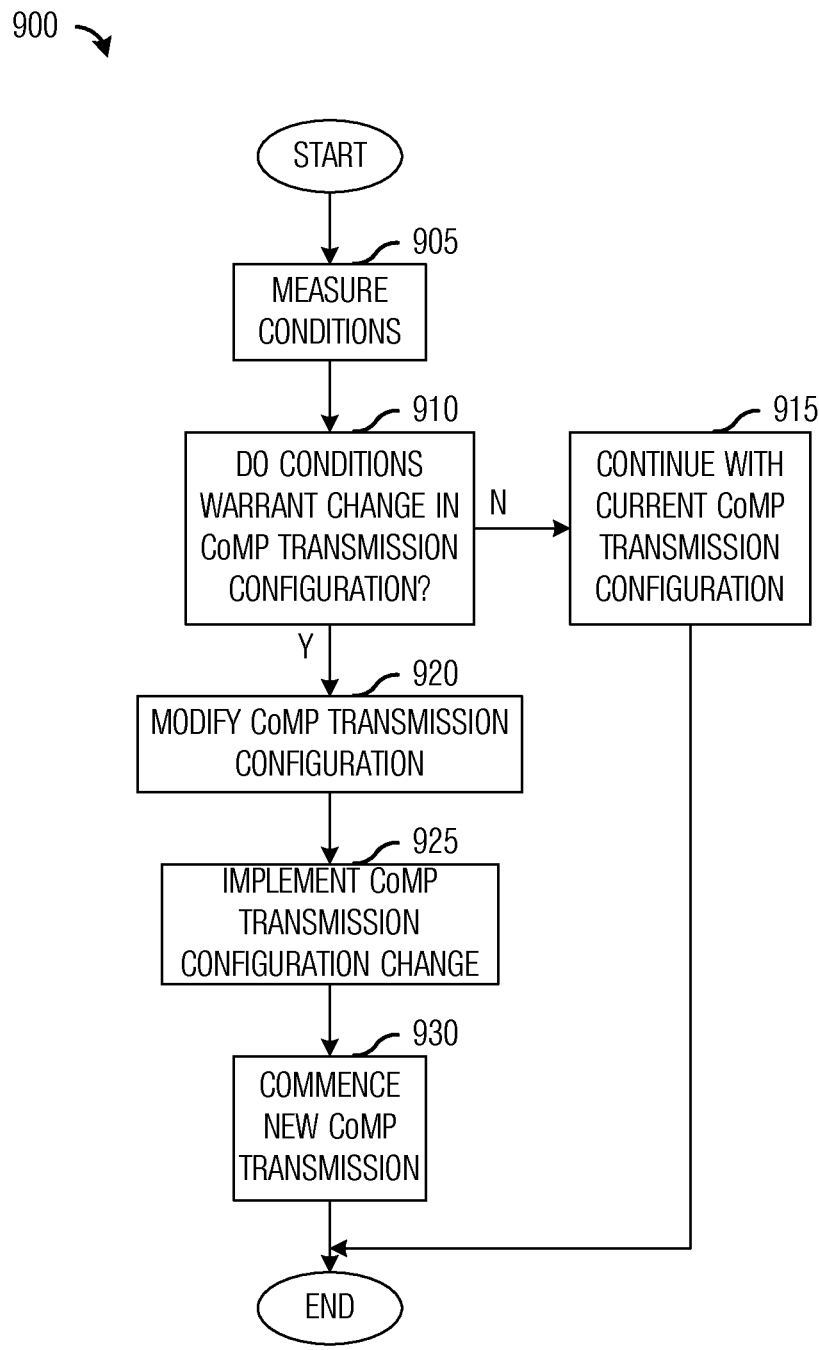
FIG. 9 illustrates an example flow diagram of operations in setting up or modifying a radio bearer for CoMP transmission according to example embodiments described herein.

FIG. 9 illustrates a flow diagram of operations 900 in setting up or modifying a CoMP transmission configuration, such as radio bearer transmission configuration therein. Operations 900 may be indicative of operations occurring as a CoMP transmission configuration, e.g., a radio bearer, is set up or modified.

Operations 900 may begin with a measurement of channel conditions (block 905). The measurement of channel conditions may be made by a UE and may be a measurement of channel conditions of channel to or from the UE. The channel conditions may also be for transmission points that are near or detectable by the UE.

The measurement of channel conditions may be used to determine if changes in an existing CoMP transmission configuration are warranted (block 910). If the measurement of channel conditions does not warrant a change in the existing CoMP transmission configuration, then the existing CoMP transmission configuration may continue as configured (block 915).

However, if the measurement of channel conditions does warrant a change in the existing CoMP transmission configuration, then the CoMP transmission configuration, e.g., the radio bearer transmission configuration, may be modified (block 920). The change to the existing CoMP transmission configuration may be implemented (or reconfigured) using an exchange of messages (block 925). Implementation of the change to the existing CoMP transmission configuration may include informing the participants of the CoMP transmission of the changes to the CoMP transmission configuration. Once the participants of the CoMP transmission have been informed and the CoMP transmission configuration has been changed, the new CoMP transmission may commence (block 930).

Figures 10A, 10B:
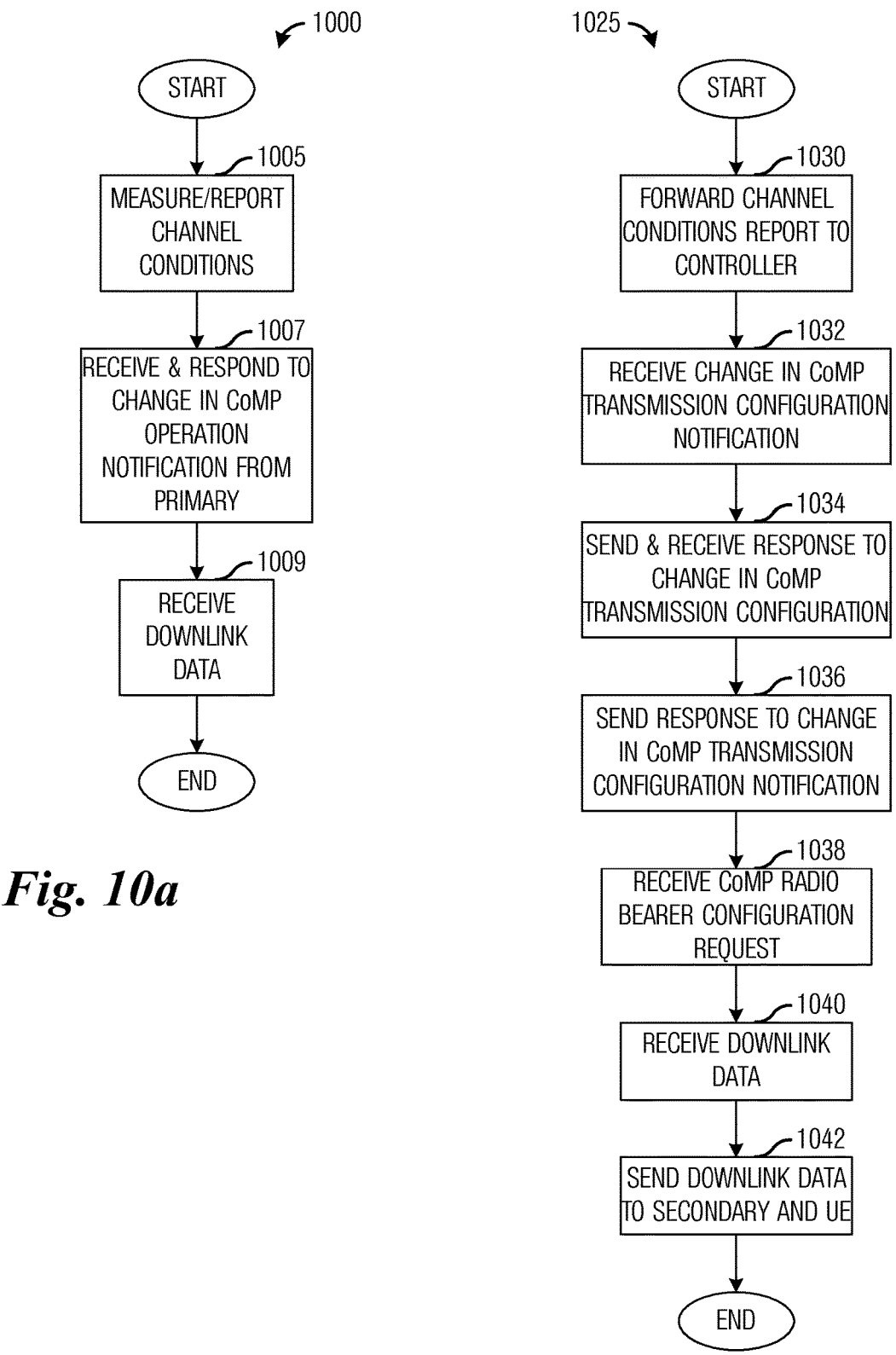
FIG. 10a illustrates an example flow diagram of UE operations in setting up or modifying a radio bearer for CoMP transmission according to example embodiments described herein.
FIG. 10b illustrates an example flow diagram of primary transmission point operations in setting up or modifying a radio bearer for CoMP transmission according to example embodiments described herein.

FIG. 10a illustrates a flow diagram of UE operations 1000 in setting up or modifying a CoMP transmission configuration. UE operations 1000 may be indicative of operations occurring in a UE, such as UE 805, as the UE participates in setting up or modifying a CoMP transmission configuration, such as radio bearer transmission configuration.

UE operations 1000 may begin with the UE measuring and reporting channel conditions (block 1005). The UE may measure and report channel conditions for itself, as well as for transmission points that are in close proximity to the UE or are detectable by the UE. The UE may report the measured channel conditions to a primary transmission point of the UE.

The UE may receive a CoMP Configuration Request message from its primary transmission point (block 1007). The CoMP Configuration Request message may be used to inform the UE of the changes to the CoMP transmission configuration, such as the addition of a transmission point, the deletion of a transmission point, the addition of a radio bearer, the deletion of a radio bearer, and so on. The CoMP Configuration Request message may identify the transmission points involved in the CoMP transmission. The CoMP Configuration Request message may also identify associated radio bearer and EPS bearer, the identity of the UE with the transmission points, associated radio bearer configuration parameters, and so on. The configuration parameters for the associated radio bearer may include how in-order delivery of PDCP packets should be performed to combine data from the RLC entities from the different transmission points, how UE 805 should respond to missing PDCP packets, and so forth. The UE may respond to the CoMP Configuration Request message with a CoMP Configuration Complete message.

The UE may receive transmissions from transmission points that are participating in CoMP transmission with the UE (block 1009). The transmissions may be from multiple transmission points, but associated with a single radio bearer.

FIG. 10b illustrates a flow diagram of primary transmission point operations 1025 in setting up or modifying a CoMP transmission configuration. Primary transmission point operations 1025 may be indicative of operations occurring in a primary transmission point, such as primary transmission point 810, as the primary transmission point participates in setting up or modifying a CoMP transmission configuration, such as radio bearer transmission configuration.

Primary transmission point operations 1025 may begin with the primary transmission point forwarding measurements of channel conditions received from a UE to a CoMP controller (block 1030).

The primary transmission point may receive a CoMP Radio Bearer Configuration Request message to inform the primary transmission point that the CoMP transmission configuration for a specified radio bearer is being changed (block 1032). The CoMP Radio Bearer Configuration Request message may include identifying information for the specified radio bearer, identifying information for an associated Enhanced Packet System (EPS) bearer, identifying information for a transmission point that will carry the specified radio bearer (e.g., whether the specified radio bearer is to be added to the primary transmission point or a secondary transmission point), identifying information for the UE in the transmission that will be carrying the specified radio bearer, configuration information on how the specified radio bearer will be transmitted in the transmission point involved (the secondary transmission point) (i.e., whether or not data for the specified radio bearer is to be split between the primary transmission point and the secondary transmission point, and if the data is to be split, what new QoS control parameters, such as QCI, ARP, bit rate, and so forth, are to be used in the primary transmission point), how in-order delivery of PDCP packets should be performed to combine data from RLC entities corresponding to different transmission points, how data retransmissions should be handled should a PDCP packet transmission fail, and so forth.

The primary transmission point may send a CoMP Configuration Request message to the UE (block 1034). The CoMP Configuration Request message may identify the transmission points involved in the CoMP transmission. The CoMP Configuration Request message may also identify associated radio bearer and EPS bearer, the identity of the UE with the transmission points, associated radio bearer configuration parameters, and so on. The configuration parameters for the associated radio bearer may include how in-order delivery of PDCP packets should be performed to combine data from the RLC entities from the different transmission points, how the UE should respond to missing PDCP packets, and so forth. The primary transmission point may receive a response from the UE.

The primary transmission point may send a CoMP Radio Bearer Configuration Response message to the CoMP controller (block 1036). The CoMP Radio Bearer Configuration Response message may contain a response from the UE responsive to the CoMP Configuration Complete message.

The primary transmission point may receive a CoMP Radio Bearer Configuration Request message from the CoMP controller (block 1038). The CoMP Radio Bearer Configuration Request message may indicate that the setting up or modification of the CoMP transmission configuration is complete. The primary transmission point may receive downlink data from a serving gateway (block 1040) and send part of the downlink data to the secondary transmission point, while sending another part of the downlink data to the UE (block 1042).

Figures 10C, 10D:
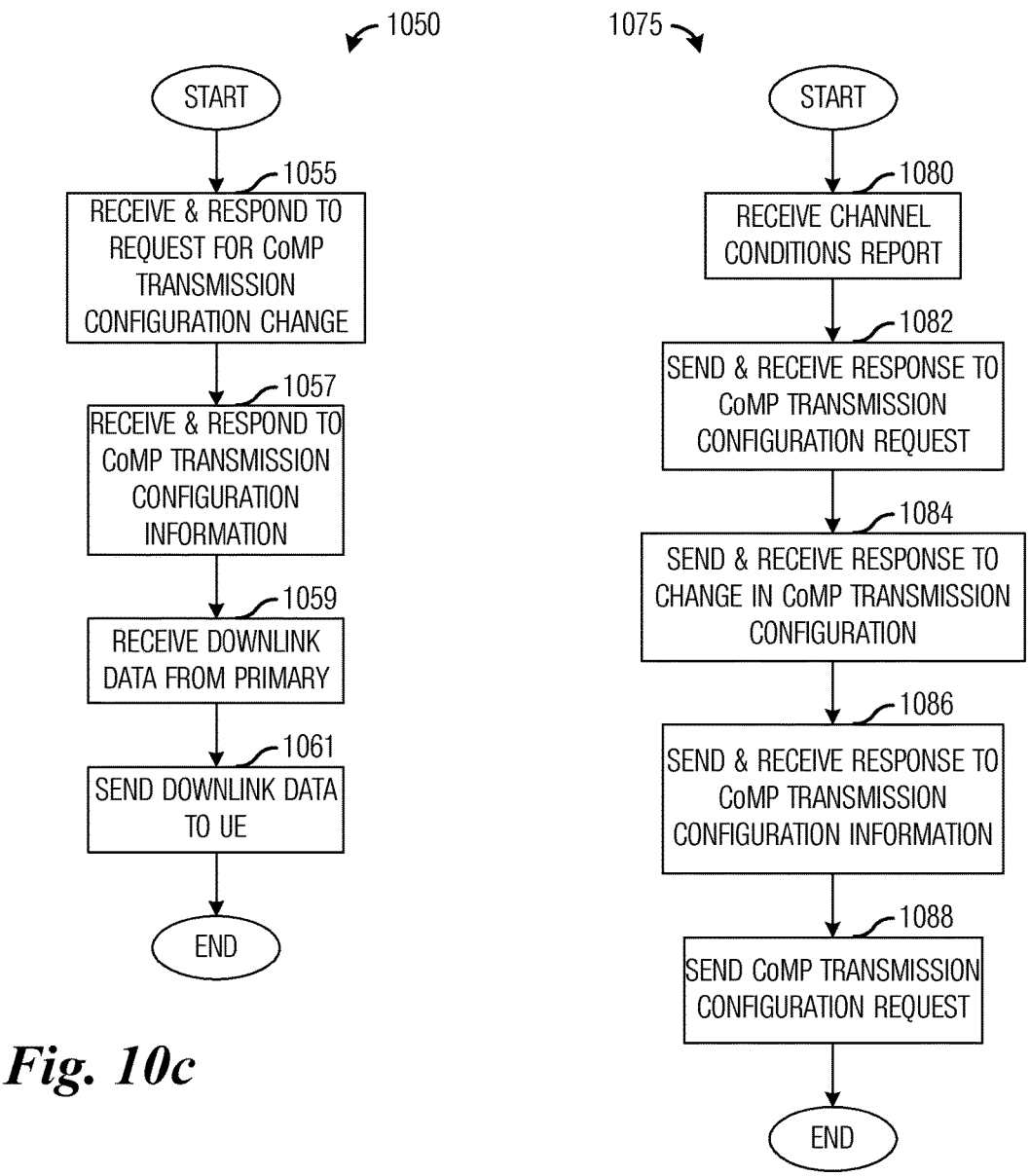
FIG. 10c illustrates an example flow diagram of secondary transmission point operations in setting up or modifying a radio bearer for CoMP transmission according to example embodiments described herein.
FIG. 10d illustrates an example flow diagram of CoMP controller operations in setting up or modifying a radio bearer for CoMP transmission according to example embodiments described herein.

FIG. 10c illustrates a flow diagram of secondary transmission point operations 1050 in setting up or modifying CoMP transmission configuration. Secondary transmission point operations 1050 may be indicative of operations occurring in a secondary transmission point, such as secondary transmission point 815, as the secondary transmission point participates in setting up or modifying a CoMP transmission configuration, such as radio bearer transmission configuration.

Secondary transmission point operations 1050 may begin with the secondary transmission point receiving a CoMP Configuration Request message (block 1055). The CoMP Configuration Request message may include the QoS and/or RRM parameters as determined by the CoMP controller. The QoS and/or RRM parameters may include QoS Class Index (QCI), Allocation and Retention Priority (ARP), bit rate information (what is a guaranteed bit rate and what is a best effort bit rate, as examples), possible radio resource partitioning (in time and/or frequency domain, for example), and so on. The secondary transmission point may respond to the CoMP Configuration Request message.

The secondary transmission point may receive a CoMP Radio Bearer Configuration Request message (block 1057). The CoMP Radio Bearer Configuration Request message may include QoS and/or RRM parameters for the radio bearer. The QoS and/or RRM parameters may include configuration information for RLC entity and MAC entity located at the secondary transmission point. The secondary transmission point may also be provided information regarding if it should provide reports of packets with failed delivery attempts and how to do so. The secondary transmission point may respond to the CoMP Radio Bearer Configuration Request message.

The secondary transmission point may receive downlink data from the primary transmission point (block 1059) and send the downlink data to the UE (block 1061).

FIG. 10*d* illustrates a flow diagram of CoMP controller operations 1075 in setting up or modifying a CoMP transmission configuration. CoMP controller operations 1075 may be indicative of operations occurring in a CoMP controller, such as CoMP controller 820, as the CoMP controller participates in setting up or modifying a CoMP transmission configuration, such as radio bearer transmission configuration.

CoMP controller operations 1075 may begin with the CoMP controller receiving measurements of channel conditions from the primary transmission point (block 1080). Based on the measurements of channel conditions, the CoMP controller may determine an appropriate CoMP transmission configuration (e.g., a CoMP mode) to be used, including settings of a radio bearer to be used in CoMP transmission, and so on. Settings of the radio bearer may include which transmission points (e.g., primary transmission point and one or more secondary transmission points) may be involved in carrying the radio bearer, as well as QoS and/or Radio Resource Management (RRM) parameters of the radio bearer from the involved transmission points.

The CoMP controller may then send a CoMP Configuration Request message to the secondary transmission point (block 1082). The CoMP Configuration Request message may include the QoS and/or RRM parameters as determined by the CoMP controller. The QoS and/or RRM parameters may include QoS Class Index (QCI), Allocation and Retention Priority (ARP), bit rate information (what is a guaranteed bit rate and what is a best effort bit rate, as examples), possible radio resource partitioning (in time and/or frequency domain, for example), and so on. The CoMP controller may receive a response from the secondary transmission point.

The CoMP controller may send a CoMP Radio Bearer Configuration Request message to the primary transmission point (block 1084). The CoMP Radio Bearer Configuration Request message may include identifying information for the specified radio bearer, identifying information for an associated Enhanced Packet System (EPS) bearer, identifying information for a transmission point that will carry the specified radio bearer (e.g., whether the specified radio bearer is to be added to the primary transmission point or the secondary transmission point), identifying information for UE 805 in the transmission that will be carrying the specified radio bearer, configuration information on how the specified radio bearer will be transmitted in the transmission point involved (the secondary transmission point) (i.e., whether or not data for the specified radio bearer is to be split between the primary transmission point and the secondary transmission point, and if the data is to be split, what new QoS control parameters, such as QCI, ARP, bit rate, and so forth, are to be used in the primary transmission point), how in-order delivery of PDCP packets should be performed to combine data from RLC entities corresponding to different transmission points, how data retransmissions should be handled should a PDCP packet transmission fail, and so forth. The CoMP controller may receive a response from the primary transmission point.

The CoMP controller may send a CoMP Radio Bearer Configuration Request message to the secondary transmission point (block 1086). The CoMP Radio Bearer Configuration Request message may include QoS and/or RRM parameters for the radio bearer. The QoS and/or RRM parameters may include configuration information for RLC entity and MAC entity located at secondary transmission point 815. The secondary transmission point may also be provided information regarding if it should provide reports of packets with failed delivery attempts and how to do so. The CoMP controller may receive a response from the secondary transmission point.

The CoMP controller may send a CoMP Radio Bearer Configuration Request message to the primary transmission point (block 1088). The CoMP Radio Bearer Configuration Request message may inform the primary transmission point that the setting up or modifying of the CoMP transmission configuration is complete.

Since the PDCP packets from the single radio bearer may be independently sent from geographically separated transmission points, their arrival at the UE may be in a different sequence from their sequence numbering assigned by the PDCP entity would indicate. Therefore, in-order delivery of the packets may need to be ensured at the UE. One technique that may be used to ensure in-order packet delivery is to enhance in-order delivery and duplicate detection functionality of the receiving PDCP entity at a UE.

Another technique is to ensure in-order packet delivery at a counterpart of the data splitting interface at the UE between the receiving RLC entities and the receiving PDCP entity. The implementation of in-order packet delivery at the interface between the receiving RLC entities and the receiving PDCP entity may be achieved using a memory, such as a buffer, and some logic.

Figure 11:
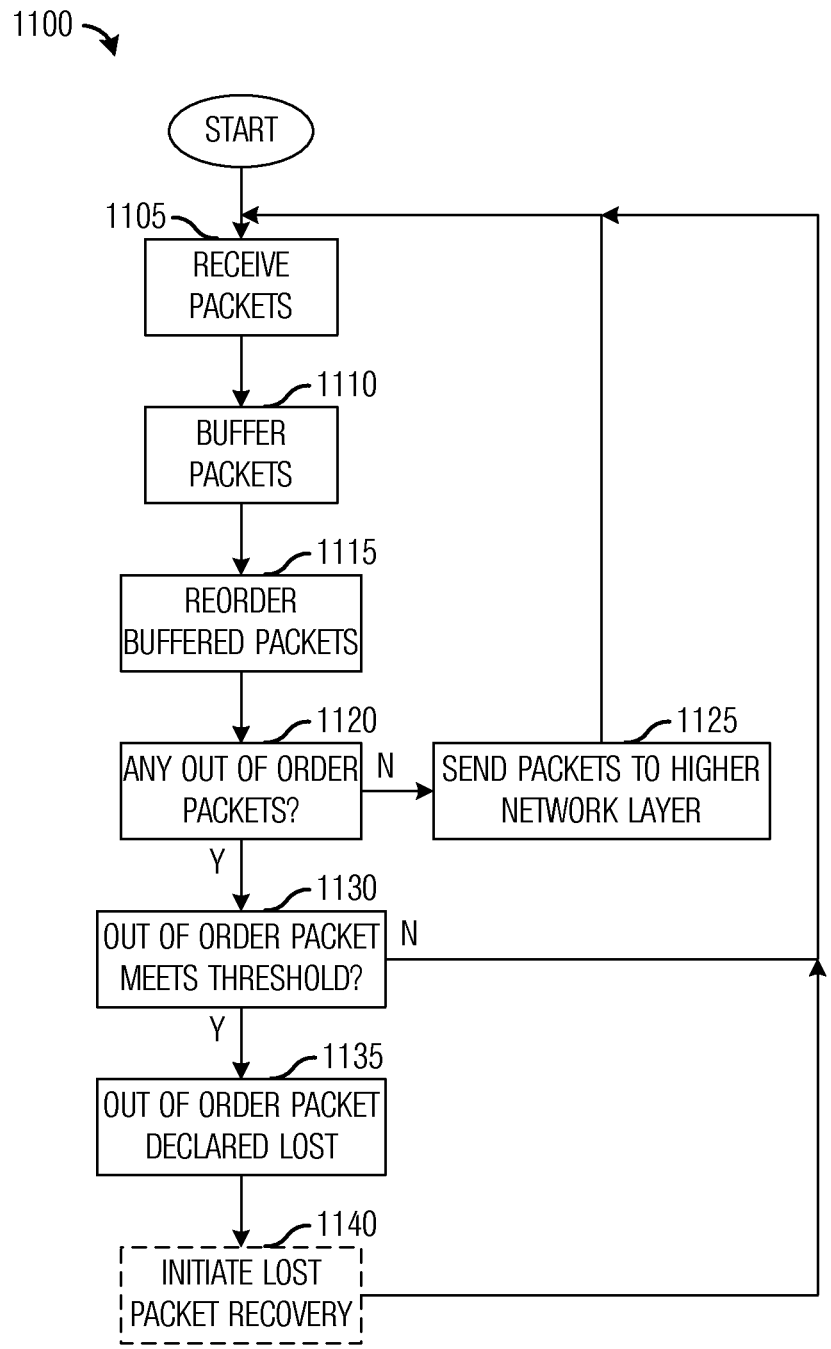
FIG. 11 illustrates an example flow diagram of operations in re-ordering of packets according to example embodiments described herein.

FIG. 11 illustrates a flow diagram of operations 1100 in re-ordering of packets. Operations 1100 may be indicative of operations occurring in a UE as the UE re-orders packets received from different transmission points.

Operations 1100 may begin with the UE receiving packets from the transmission points (block 1105). Since the packets may be sent from geographically separated points but associated with a single radio bearer, the packets may arrive in an order different from their intended receiving order. The received packets may then be stored in a memory, such as a buffer (block 1110).

The stored packets may be ordered based on a sequencing number, such as a PDCP sequence number (block 1115). The sequencing number, such as the PDCP sequence number, may be assigned to each of the packets as they are prepared for distribution by the primary transmission point and are distributed to the secondary transmission points (as well as the primary transmission point).

A check may be performed to determine if there are any missing packets (block 1120). According to an example embodiment, missing packets may be detected by scanning the ordered packets and determining if there is a discontinuity (e.g., a missing sequence number or missing sequence numbers) in the sequencing number of the ordered packets.

Since the packets have been ordered, the presence of a missing packet may indicate that there is an out of order packet or packets. As an illustrative example, consider an ordered list of packets with PDCP sequence numbers: 1, 2, 3, 4, and 5. Since there are only five packets and they are in order per their PDCP sequence number, there are no missing packets and none of them are out of order or lost. However, consider an ordered list of packets with PDCP sequence numbers: 6, 7, 8, 10, and 11. Since a packet with PDCP sequence number 9 is absent, it may be considered that the packet with PDCP sequence number 9 is out of order and potentially lost.

If there are no out of order packets in the memory (block 1120), then none of the packets in the memory are out of order or are lost and the packets may be provided to a higher network layer entity, such as the PDCP entity for processing (block 1125).

However, since the packets may be arriving from different transmission points, just because a particular packet is out of order does not mean that the packet is actually lost. A threshold may be used to help determine if the particular packet is actually lost in transmission or simply delayed because it was transmitted by a different transmission point.

According to an example embodiment, the threshold may be a specified amount of time (e.g., as implemented by a timer or a counter) that the UE will wait for the particular packet to arrive before declaring the particular packet as lost. Alternatively, the threshold may be a number of packets that is received by the UE after the UE detects that the particular packet is missing before the UE declares that the particular packet as lost. The number of packets may be specified specifically for a transmission point. For example, the UE will wait until it has received the specified number of packets from the same transmission point that was expected to transmit the particular packet before declaring the particular packet as lost.

A check may be performed to determine if the particular packet meets the threshold (block 1130). If the particular packet does not meet the threshold, then the UE may continue to wait for arrival of the particular packet, as well as other packets (block 1105). If the particular packet meets the threshold, then the particular packet may be considered to be a lost packet (block 1135) and the UE may optionally initiate lost packet recovery (block 1140).

According to an example embodiment, the UE may initiate lost packet recovery by sending a report to the primary transmission point with the report indicating that the particular packet has been lost. Alternatively, the UE may send the report to a CoMP controller. The UE may help to reduce overhead by aggregating a number of lost packets or waiting for a specified amount of time before sending a report. Furthermore, the UE may send a negative acknowledgement to the transmission point responsible for transmitting the particular packet.

The UE may return to block 1105 to wait for the arrival of additional packets.

Once a PDCP PDU has passed through a data splitting interface, such as data splitting interface 610, to a transmission point for transmission to the UE, then the transmission of the PDCP PDU becomes the sole responsibility of the transmission point. If, for some reason, the packet does not arrive at the UE, such as due to poor channel condition, high load, etc., the PDCP PDU may be declared lost. Network based and/or UE assisted approaches may be used to help mitigate lost packets.

Figure 12A:
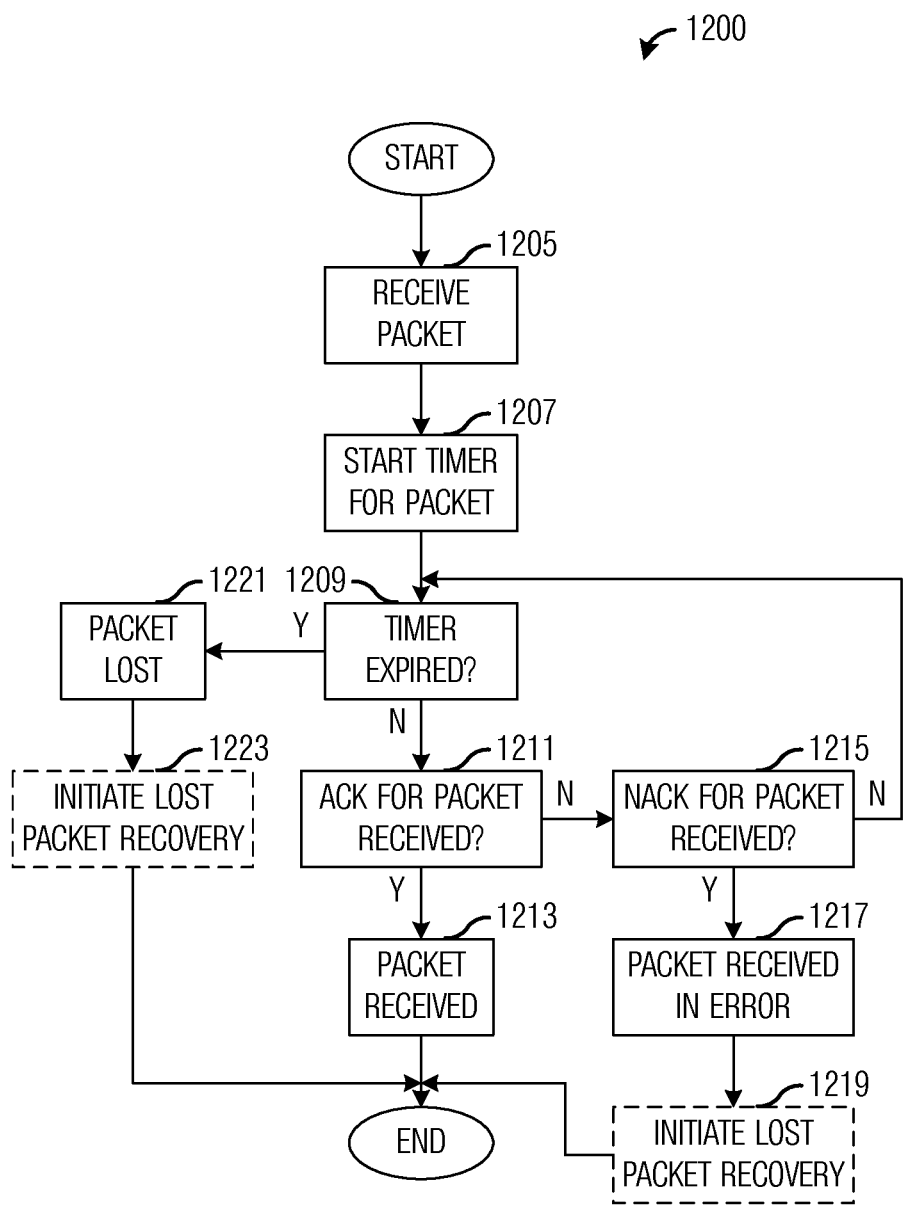
FIG. 12a illustrates an example flow diagram of operations in an RLC entity as the RLC entity performs network assisted lost packet mitigation according to example embodiments described herein.

FIG. 12a illustrates a flow diagram of operations 1200 in a data splitting interface as the data splitting interface performs network assisted lost packet mitigation. Operations 1200 may be indicative of operations occurring in a data splitting interface, for example, data splitting interface 610 at a secondary transmission point, as the data splitting interface assists in detecting and reporting lost and/or error packets.

Operations 1200 may begin with the data splitting interface receiving a packet (block 1205). The data splitting interface, located in a transmission point, may receive the packet from the PDCP entity and a data splitting interface, both located in a primary transmission point. The data splitting interface may start a timer (or a counter) to be associated with the packet to be used in determining if the packet is lost in delivery. The timer (or the counter) may make use of a time value associated with the packet, which if the packet is not delivered to a UE before the timer (or the counter) expires, the packet is to be deemed as having been lost.

The data splitting interface may perform a check to determine if the timer (or the counter) has expired (block 1209). If the timer (or the counter) has not expired, the data splitting interface may perform a check to determine if a positive acknowledgement associated with the packet has been received (block 1211). In general, the positive acknowledgement may be an indication that the UE received the packet and was able to successfully decode the packet. If the positive acknowledgement has been received for the packet, then the data splitting interface may deem that the packet has been successfully delivered to the UE (block 1213) and the timer (or the counter) may be reset.

If the positive acknowledgement has not been received for the packet, the data splitting interface may perform a check to determine if a negative acknowledgement has been received for the packet (block 1215). In general, the negative acknowledgement may be an indication that the UE received the packet and was not able to successfully decode the packet. If the negative acknowledgement has been received for the packet, then the data splitting interface may deem that the packet has been received in error by the UE (block 1219) and the data splitting interface may optionally initiate lost packet recovery (block 1219), which may include sending a lost packet report to the primary transmission point.

If the timer (or the counter) has expired (block 1209), then the data splitting interface may deem that the packet has been lost (block 1221) and the data splitting interface may optionally initiate lost packet recovery (block 1223), which may include sending a lost packet report to the primary transmission point.

Figure 12B:
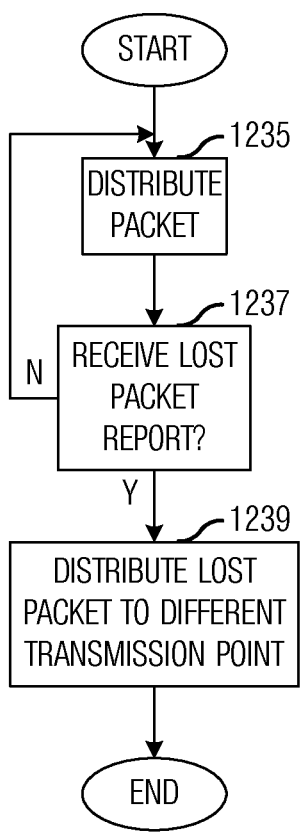
FIG. 12b illustrates an example flow diagram of operations in a PDCP entity as the PDCP entity performs network assisted lost packet mitigation according to example embodiments described herein.

FIG. 12b illustrates a flow diagram of operations 1230 in a data splitting interface of a primary transmission point as the data splitting interface recovers and/or redistributes lost and/or error packets in lost packet mitigation, wherein the lost packet mitigation may be in the form of network assisted and/or UE assisted lost packet mitigation. Operations 1230 may be indicative of operations occurring in a data splitting interface as the data splitting interface assists in recovering from lost packets and redistributing packets for potential retransmission.

Operations 1230 may begin with the data splitting interface distributing a packet to a transmission point (block 1235). As discussed previously, the data splitting interface may distribute the packet to any of N transmission points based on a distribution.

The data splitting interface may then perform a check to determine if it has received a lost packet report from one of the transmission points or from a UE (block 1237). According to an example embodiment, the transmission points or UEs may be configured to provide a lost packet report upon the detection of a lost packet, upon detection of a specified number of lost packets, periodically provide a lost packet report even if no lost packets have occurred, or so forth. If the data splitting interface has not received a lost packet report, then it may return to block 1235 to distribute additional packets.

If the data splitting interface has received a lost packet report indicating the lost of one or more packets, then the data splitting interface may re-distribute the lost packet(s) to a different transmission point (or transmission points) (block 1239). The data splitting interface may alter the distribution so that the number of packets distributed to a transmission point that is a source of the lost packet may be reduced, while the number of packets distributed to another transmission point that is not having lost packets may be increased, as examples. According to an example embodiment, the data splitting interface may distribute the lost packet based on a number of considerations, such as lost packet rate for the various transmission points, available resources at the various transmission points, transmission point load, and so on.

Furthermore, the data splitting interface may consider re-distributing the lost packet to the transmission point that reported the lost packet if the transmission point has not lost a large number of packets, the transmission point has a historically good lost packet rate, and so on.

Figure 12C:
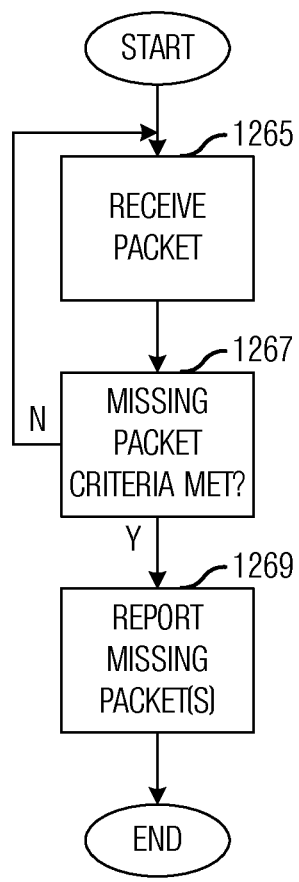
FIG. 12c illustrates an example flow diagram of operations in UE assisted lost packet mitigation according to example embodiments described herein.

FIG. 12c illustrates a flow diagram of operations 1260 in UE assisted lost packet mitigation. Operations 1260 may be indicative of operations occurring in a UE as the UE assists in detecting and recovering from lost packets.

Operations 1260 may begin with the UE receiving a packet (block 1265). The UE may perform a check to determine if a missing packet criterion has been met (block 1267). An example of a missing packet criterion may include a missing packet in a re-ordering buffer for a specified amount of time or a specified number of packet receptions, and so forth. If the missing packet criterion is met, then the UE may report the missing packet(s) to the primary transmission point, the CoMP controller, or both (block 1269).

Alternatively, instead of immediately reporting each missing packet, the UE may wait a specified amount of time before reporting the missing packet. Alternatively, the UE may wait until there is a specified number of missing packets before reporting the missing packets. The UE may aggregate the information about the missing packets.

Alternatively, the UE may be configured to provide a status report on missing packets, even if there are no missing packets at the time of the status report. A period for the status reports or a trigger for triggering a status report may be specified by a primary transmission point or a CoMP controller.

Figure 13:
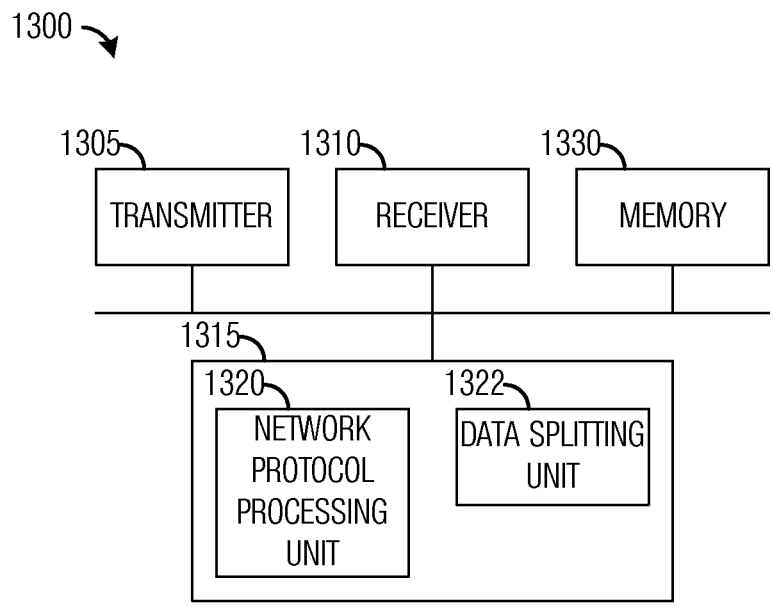
FIG. 13 provides an example illustration of a transmission point according to example embodiments described herein.

FIG. 13 provides an illustration of a transmission point 1300. Transmission point 1300 may be an implementation of a communications controller, such as an eNB, a BS, a cell, a RRH, or so on. Transmission point 1300 may be used to implement various ones of the embodiments discussed herein. As shown in FIG. 13, a transmitter 1305 is configured to transmit information and a receiver 1310 is configured to receive information. Transmitter 1305 and receiver 1310 may have a wireless interface, a wireline interface, or a combination thereof. In practice, transmitter 1305 and receiver 1310 might be implemented in a single unit of hardware.

A network protocol processing unit 1320 is configured to provide processing of packets at one or more network protocol layers. As an example, network protocol processing unit 1320 may include a PDCP entity, a RLC entity, a MAC entity, or so on. Depending on radio bearer configuration, not every entity is available for processing of packets. Consider a situation wherein a single radio bearer is split between multiple transmission points. In such a situation, a RLC entity may be available, but a PDCP entity may not be available depending on the configuration of transmission point 1300 (e.g., a primary transmission point versus a secondary transmission point).

A data splitting unit 1322 is configured to handle data splitting related functions when sending a single radio bearer over multiple transmission point. For example, for a primary transmission point, data splitting unit 1322 may split packets of a single radio bearer for distribution to transmission points involved with the single radio bearer. Data splitting unit 1322 is configured to distribute the packets to the transmission points based on a desired distribution that may be based on considerations such as transmission point capability, transmission point load, channel quality, and so forth. Data splitting unit 1322 may determine its own desired distribution as well as other aspects of CoMP transmission or receive them from the CoMP controller or determine them in conjunction with the CoMP controller. Data splitting unit 1322 may also receive feedback from other network entities regarding the delivery status of individual packets, and initiate packet redistribution/loss discovery when necessary. For a secondary transmission point, data splitting unit 1322 may receive packets from a primary and provide feedback to the primary when necessary. A memory 1330 is configured to store packets for transmission, CoMP transmission configuration information, and so forth.

The elements of transmission point 1300 may be implemented as specific hardware logic blocks. In an alternative, the elements of transmission point 1300 may be implemented as software executing in a processor, microprocessor, digital signal processor, controller, application specific integrated circuit, or so on. In yet another alternative, the elements of transmission point 1300 may be implemented as a combination of software and/or hardware.

As an example, transmitter 1305 and receiver 1310 may be implemented as a specific hardware block, while network protocol processing unit 1320, and data splitting unit 1322 may be software modules executing in a processor 1315, such as a microprocessor, a digital signal processor, a custom circuit, or a custom compiled logic array of a field programmable logic array.

Figure 14:
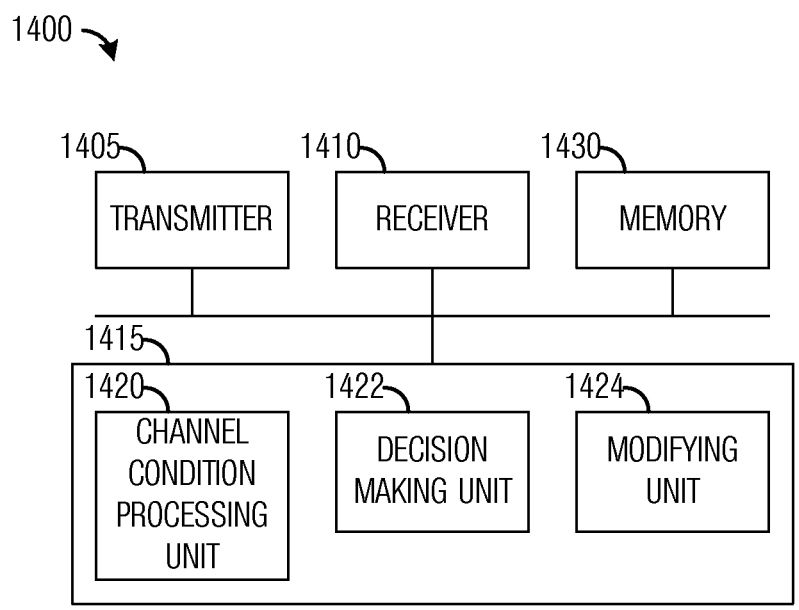
FIG. 14 provides an example illustration of a CoMP controller according to example embodiments described herein.

FIG. 14 provides an illustration of a CoMP controller 1400. CoMP controller 1400 may be an implementation of a network entity intended to provide control of CoMP transmissions occurring in a communications system. Alternatively, CoMP controller 1400 may be implemented as a logical entity that is part of an existing network entity, such as a communications controller, a gateway, an eNB, or so on, in the communications system. CoMP controller 1400 may be used to implement various ones of the embodiments discussed herein. As shown in FIG. 14, a transmitter 1405 is configured to transmit information and a receiver 1410 is configured to receive information. Transmitter 1405 and receiver 1410 may have a wireless interface, a wireline interface, or a combination thereof. In practice, transmitter 1405 and receiver 1410 might be implemented in a single unit of hardware.

A channel condition processing unit 1420 is configured to process channel condition reports from UEs. For example, channel condition reports from UEs may provide indications of the condition of channels to and from the UE as well as the condition of communications controllers near or detectable by the UE. Channel condition processing unit 1420 may combine the channel condition reports from multiple sources (such as other UEs) to obtain a picture of the UE's operating condition.

A decision making unit 1422 is configured to make a decision on the UE's CoMP transmission configuration, such as a radio bearer configuration for CoMP transmission, based on the operating condition of the UE. As an example, if the operating condition of the UE is high, the UE's CoMP transmission configuration may be adjusted to increase an overall performance of the CoMP transmission to the UE. Similarly, if the operating condition of the UE is low, the UE's CoMP transmission configuration may be adjusted to decrease the overall performance of the CoMP transmission to the UE to achieve better error performance.

A modifying unit 1424 is configured to generate messaging to implement changes in the CoMP transmission configuration of the UE. The messaging may be transmitted to the various members of the UE's CoMP cooperating set to change the CoMP transmission configuration. A memory 1430 is configured to store packets for transmission, CoMP transmission configuration information, radio bearer configuration information, and so forth.

The elements of CoMP controller 1400 may be implemented as specific hardware logic blocks. In an alternative, the elements of CoMP controller 1400 may be implemented as software executing in a processor, microprocessor, digital signal processor, controller, application specific integrated circuit, or so on. In yet another alternative, the elements of CoMP controller 1400 may be implemented as a combination of software and/or hardware.

As an example, transmitter 1405 and receiver 1410 may be implemented as a specific hardware block, while channel condition processing unit 1420, decision making unit 1422, and modifying unit 1424 may be software modules executing in a processor 1415, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for multiple point transmission operation for a user equipment (UE), the method comprising:
   informing, by a first transmission point to a second transmission point, to modify a bearer configuration associated with a bearer, the bearer split by a first packet data convergence protocol (PDCP) entity of the first transmission point and transferred by the first PDCP entity to a radio link control (RLC) entity of the second transmission point without going through any PDCP entity of the second transmission point, with the first PDCP entity operating at a PDCP layer and the RLC entity operating at an RLC layer; and
   receiving, by the first transmission point from the second transmission point, a response indicating a modified configuration associated with the bearer.

2. The method of claim 1, wherein the bearer is a radio bearer.

3. The method of claim 1, wherein the bearer is an enhanced packet system (EPS) bearer.

4. The method of claim 1, wherein the bearer is an E-UTRAN Radio Access Bearer (E_RAB).

5. The method of claim 1, wherein the first transmission point is co-located with a multiple point transmission controller.

6. The method of claim 1, wherein the modified configuration associated with the bearer comprises one or more of:
   addition of a new transmission point to a transmission of the bearer,
   configuration of an RLC entity for the new transmission point,
   removal of an existing transmission point, or
   addition of an additional bearer to a multiple point transmission configuration.

7. The method of claim 1, wherein the informing comprises sending one or more of:
   QoS parameters, or
   radio resource parameters.

8. The method of claim 7, wherein the QoS parameters comprise one or more of:
   QoS class index (QCI),
   allocation and retention priority (ARP), or
   bit rate information.

9. The method of claim 1, wherein the informing comprises sending one or more of:
   identifying information for the bearer,
   identifying information for an associated enhanced packet system (EPS) bearer,
   identifying information for a selected transmission point that will carry the bearer,
   identifying information for the UE, or
   configuration information indicating whether data of the bearer will be transmitted by the second transmission point only or will be split between the first transmission point and the second transmission point.

10. The method of claim 1, wherein the informing comprises sending one or more of:
    QoS parameters for the bearer,
    radio resource parameters for the bearer, or
    information indicating parameters which configure conditions under which packet transmission status feedback is provided by the second transmission point.

11. The method of claim 1, wherein the response received from the second transmission point comprises an identifier assigned to the UE in a context of the second transmission point, when the modified configuration is acceptable to the second transmission point.

12. The method of claim 1, wherein, when the modified configuration is acceptable to the second transmission point, the response received from the second transmission point comprises one or more of:
    configuration parameters of associated RLC entities, or
    configuration parameters of associated media access control (MAC) entities.

13. The method of claim 1, further comprising receiving a negative reply to modify the bearer configuration associated with the bearer, when the modified configuration is not acceptable to the second transmission point.

14. The method of claim 1, wherein the informing further comprises informing a plurality of second transmission points to modify the bearer configuration associated with the bearer.

15. A method for multiple point transmission operation for a user equipment (UE), the method comprising:
    receiving, by a second transmission point from a first transmission point, a request to modify a bearer configuration associated with a bearer, the bearer split by a first packet data convergence protocol (PDCP) entity of the first transmission point and transferred by the first PDCP entity to a radio link control (RLC) entity of the second transmission point without going through any PDCP entity of the second transmission point, with the first PDCP entity operating at a PDCP layer and the RLC entity operating at an RLC layer; and sending, by the second transmission point to the first transmission point, a response indicating a modified configuration associated with the bearer.

16. The method of claim 15, wherein the bearer is a radio bearer.

17. The method of claim 15, wherein the bearer is an enhanced packet system (EPS) bearer.

18. The method of claim 15, wherein the bearer is an E-UTRAN Radio Access Bearer (E_RAB).

19. The method of claim 15, wherein the first transmission point is co-located with a multiple point transmission controller.

20. The method of claim 15, wherein the modified configuration associated with the bearer comprises one or more of:
   addition of a new transmission point to a transmission of the bearer,
   configuration of an RLC entity for the new transmission point,
   removal of an existing transmission point, or
   addition of an additional bearer to a multiple point transmission configuration.

21. The method of claim 15, wherein the receiving comprises receiving one or more of:
   QoS parameters, or
   radio resource parameters.

22. The method of claim 21, wherein the QoS parameters comprise one or more of:
   QoS class index (QCI),
   allocation and retention priority (ARP), or
   bit rate information.

23. The method of claim 15, wherein the request comprises one or more of:
   identifying information for the bearer,
   identifying information for an associated enhanced packet system (EPS) bearer,
   identifying information for a selected transmission point that will carry the bearer,
   identifying information for the UE, or
   configuration information indicating whether data of the bearer will be transmitted by the second transmission point only or will be split between the first transmission point and the second transmission point.

24. The method of claim 15, wherein the request comprises one or more of:
   QoS parameters for the bearer,
   radio resource parameters for the bearer, or
   information indicating parameters which configure conditions under which packet transmission status feedback is provided by the second transmission point.

25. The method of claim 15, wherein the response sent by the second transmission point comprises an identifier assigned to the UE in a context of the second transmission point, when the modified configuration is acceptable to the second transmission point.

26. The method of claim 15, wherein, when the modified configuration is acceptable to the second transmission point, the response sent by the second transmission point comprises one or more of:
   configuration parameters of associated RLC entities, or
   configuration parameters of associated media access control (MAC) entities.

27. The method of claim 15, further comprising sending a negative reply to modify the bearer configuration associated with the bearer, when the modified configuration is not acceptable to the second transmission point.

28. The method of claim 15, wherein a plurality of second transmission points receives the request to modify the bearer configuration associated with the bearer.

29. A first transmission point for multiple point transmission operation for a user equipment (UE), the first transmission point comprising:
   a transmitter;
   a processor coupled to the transmitter, the processor in conjunction with the transmitter configured to inform a second transmission point to modify a bearer configuration associated with a bearer split by a first packet data convergence protocol (PDCP) entity of the first transmission point and transferred by the first PDCP entity to a radio link control (RLC) entity of the second transmission point without going through any PDCP entity of the second transmission point, with the first PDCP entity operating at a PDCP layer and the RLC entity operating at an RLC layer; and
   a receiver coupled to the processor and configured to receive from the second transmission point a response indicating a modified configuration associated with the bearer.

30. The first transmission point of claim 29, wherein the bearer is a radio bearer.

31. The first transmission point of claim 29, wherein the bearer is an enhanced packet system (EPS) bearer.

32. The first transmission point of claim 29, wherein the bearer is an E-UTRAN Radio Access Bearer (E_RAB).

33. The first transmission point of claim 29, wherein the first transmission point is co-located with a multiple point transmission controller.

34. The first transmission point of claim 29, wherein the modified configuration associated with the bearer comprises one or more of:
   addition of a new transmission point to a transmission of the bearer,
   configuration of an RLC entity for the new transmission point,
   removal of an existing transmission point, or
   addition of an additional bearer to a multiple point transmission configuration.

35. The first transmission point of claim 29, wherein the processor in conjunction with the transmitter configured to inform comprises the processor in conjunction with the transmitter configured to send one or more of:
   QoS parameters, or
   radio resource parameters.

36. The first transmission point of claim 35, wherein the QoS parameters comprise one or more of:
   QoS class index (QCI),
   allocation and retention priority (ARP), or
   bit rate information.

37. The first transmission point of claim 29, wherein the processor in conjunction with the transmitter configured to inform comprises the processor in conjunction with the transmitter configured to send one or more of:
   identifying information for the bearer,
   identifying information for an associated enhanced packet system (EPS) bearer,
   identifying information for a selected transmission point that will carry the bearer,
   identifying information for the UE, or configuration information indicating whether data of the bearer will be transmitted by the second transmission point only or will be split between the first transmission point and the second transmission point.

38. The first transmission point of claim 29, wherein the processor in conjunction with the transmitter configured to inform comprises the processor in conjunction with the transmitter configured to send one or more of:
   QoS parameters for the bearer,
   radio resource parameters for the bearer, or
   information indicating parameters which configure conditions under which packet transmission status feedback is provided by the second transmission point.

39. The first transmission point of claim 29, wherein the response received from the second transmission point comprises an identifier assigned to the UE in a context of the second transmission point, when the modified configuration is acceptable to the second transmission point.

40. The first transmission point of claim 29, wherein, when the modified configuration is acceptable to the second transmission point, the response received from the second transmission point comprises one or more of:
   configuration parameters of associated RLC entities, or
   configuration parameters of associated media access control (MAC) entities.

41. The first transmission point of claim 29, wherein the receiver is further configured to receive a negative reply to modify the bearer configuration associated with the bearer, when the modified configuration is not acceptable to the second transmission point.

42. The first transmission point of claim 29, wherein the processor in conjunction with the transmitter configured to inform further comprises the processor in conjunction with the transmitter configured to inform a plurality of second transmission points to modify the bearer configuration associated with the bearer.

43. A second transmission point for multiple point transmission operation for a user equipment (UE), the second transmission point comprising:
   a receiver configured to receive from a first transmission point a request to modify a bearer configuration associated with a bearer split by a first packet data convergence protocol (PDCP) entity of the first transmission point and transferred by the first PDCP entity to a radio link control (RLC) entity of the second transmission point without going through any PDCP entity of the second transmission point, with the first PDCP entity operating at a PDCP layer and the RLC entity operating at an RLC layer;
   a processor coupled to the receiver and configured to generate a response indicating a modified configuration associated with the bearer; and
   a transmitter coupled to the processor and configured to send to the first transmission point the response indicating the modified configuration associated with the bearer.

44. The second transmission point of claim 43, wherein the bearer is a radio bearer.

45. The second transmission point of claim 43, wherein the bearer is an enhanced packet system (EPS) bearer.

46. The second transmission point of claim 43, wherein the bearer is an E-UTRAN Radio Access Bearer (E_RAB).

47. The second transmission point of claim 43, wherein the first transmission point is co-located with a multiple point transmission controller.

48. The second transmission point of claim 43, wherein the modified configuration associated with the bearer comprises one or more of:
   addition of a new transmission point to a transmission of the bearer,
   configuration of an RLC entity for the new transmission point,
   removal of an existing transmission point, or
   addition of an additional bearer to a multiple point transmission configuration.

49. The second transmission point of claim 43, wherein the receiver configured to receive comprises the receiver configured for receiving one or more of:
   QoS parameters, or
   radio resource parameters.

50. The second transmission point of claim 49, wherein the QoS parameters comprise one or more of:
   QoS class index (QCI),
   allocation and retention priority (ARP), or
   bit rate information.

51. The second transmission point of claim 43, wherein the request comprises one or more of:
   identifying information for the bearer,
   identifying information for an associated enhanced packet system (EPS) bearer,
   identifying information for a selected transmission point that will carry the bearer,
   identifying information for the UE, or
   configuration information indicating whether data of the bearer will be transmitted by the second transmission point only or will be split between the first transmission point and the second transmission point.

52. The second transmission point of claim 43, wherein the request comprises one or more of:
   QoS parameters for the bearer,
   radio resource parameters for the bearer, or
   information indicating parameters which configure conditions under which packet transmission status feedback is provided by the second transmission point.

53. The second transmission point of claim 43, wherein the response sent by the second transmission point comprises an identifier assigned to the UE in a context of the second transmission point, when the modified configuration is acceptable to the second transmission point.

54. The second transmission point of claim 43, wherein, when the modified configuration is acceptable to the second transmission point, the response sent by the second transmission point comprises one or more of:
   configuration parameters of associated RLC entities, or
   configuration parameters of associated media access control (MAC) entities.

55. The second transmission point of claim 43, wherein the transmitter is further configured to send a negative reply to modify the bearer configuration associated with the bearer, when the modified configuration is not acceptable to the second transmission point.

56. The second transmission point of claim 43, wherein a plurality of second transmission points are configured to receive the request to modify the bearer configuration associated with the bearer.

* * * * *